(12) United States Patent
Wang et al.

(10) Patent No.: US 12,470,973 B2
(45) Date of Patent: Nov. 11, 2025

(54) METHOD AND DEVICE FOR CONFIGURING NODE TO TRANSMIT AND RECEIVE DATA

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 543 days.

(21) Appl. No.: 17/250,931

(22) PCT Filed: Sep. 25, 2019

(86) PCT No.: PCT/KR2019/012461
§ 371 (c)(1),
(2) Date: Mar. 29, 2021

(87) PCT Pub. No.: WO2020/067715
PCT Pub. Date: Apr. 2, 2020

(65) Prior Publication Data
US 2021/0392538 A1 Dec. 16, 2021

(30) Foreign Application Priority Data

Sep. 29, 2018 (CN) .......................... 201811150960.0
Mar. 27, 2019 (CN) .......................... 201910238909.3

(51) Int. Cl.
*H04W 28/02* (2009.01)
(52) U.S. Cl.
CPC ... *H04W 28/0263* (2013.01); *H04W 28/0268* (2013.01)

(58) Field of Classification Search
CPC .......... H04B 7/15528; H04W 28/0263; H04W 28/0268; H04W 76/12; H04W 76/11
See application file for complete search history.

(56) References Cited

U.S. PATENT DOCUMENTS 10,034,221 B2  7/2018  Cao et al.
2015/0244430 A1  8/2015  Shattil
(Continued)

FOREIGN PATENT DOCUMENTS

CN  104969619 A   10/2015
KR  10-0579484 B1  5/2006
(Continued)

OTHER PUBLICATIONS

International Search Report and Written Opinion of the International Searching Authority in connection with International Application No. PCT/KR2019/012461 dated Jan. 10, 2020, 10 pages.
(Continued)

*Primary Examiner* — Mehmood B. Khan

(57) ABSTRACT

The present disclosure provides a method and device for configuring a node to transmit and receive data. A second node receives a first message by a first node, wherein the first message comprises at least one of information for determining a channel used by the second node to transmit data received by the second node, or information for determining a radio bearer to transmit data received. Also, the second node transmits the received data mapped to at least one of the channel or the radio bearer used to transmit the data. Through the above method and device, mapping between the received data and transmitted data of each node in a multi-hop network is realized.

16 Claims, 8 Drawing Sheets

(56) References Cited

U.S. PATENT DOCUMENTS

| | | |
|---|---|---|
| 2017/0347302 A1 | 11/2017 | Li et al. |
| 2018/0270166 A1 | 9/2018 | Pack et al. |
| 2019/0297555 A1* | 9/2019 | Hampel ............... H04W 40/023 |
| 2020/0120725 A1* | 4/2020 | Mildh ................... H04W 76/12 |
| 2021/0014768 A1* | 1/2021 | Hong .................... H04W 40/22 |
| 2021/0168646 A1* | 6/2021 | Chen ..................... H04W 28/10 |
| 2021/0297892 A1* | 9/2021 | Teyeb ................... H04W 40/22 |
| 2022/0038381 A1* | 2/2022 | Lohr ...................... H04L 47/34 |
| 2022/0046463 A1* | 2/2022 | Wu ................... H04W 28/0278 |

FOREIGN PATENT DOCUMENTS

| | | | | |
|---|---|---|---|---|
| KR | 10-1811029 B1 | | 1/2018 | |
| WO | WO-2010047626 A1 | * | 4/2010 | ............ H04W 28/24 |
| WO | WO-2011087407 A1 | * | 7/2011 | ............ H04B 7/155 |
| WO | 2016/131188 A1 | | 8/2016 | |
| WO | WO-2019184482 A1 | * | 10/2019 | ............ H04W 76/12 |
| WO | WO-2020027491 A1 | * | 2/2020 | ............ H04W 28/04 |
| WO | WO-2020063504 A1 | * | 4/2020 | ............ H04W 28/04 |

OTHER PUBLICATIONS

Klaus Moschner et al., "NGMN 'RAN functional split and x-haul' work item," R3-181602, 3GPP TSG-RAN WG3#99bis, Sanya, China, Apr. 16-20, 2018, 49 pages.

Rejection Decision dated Mar. 31, 2023, in connection with Chinese Application No. 201910238909.3, 12 pages.

ZTE, "Discussion on user plane bearer mapping and comparison", 3GPP TSG-RAN WG2#103bis, Oct. 8-12, 2018, R2-1814723, 6 pages.

Chinese Patent Office, Second Office Action, dated Jan. 4, 2023, in connection with Chinese Application No. 2019102389093, 8 pages.

Notice of Grant of Invention Patent Right issued Dec. 31, 2024, in connection with Chinese Patent Application No. 201910238909.3, 8 pages.

* cited by examiner

THE FIRST NODE, TO THE SECOND NODE, TRANSMITS A MESSAGE INCLUDING INFORMATION RELATED TO DETERMINING THAT THE SECOND NODE TRANSMITS THE DATA RECEIVED BY THE SECOND NODE

THE SECOND NODE, RECEIVES A MESSAGE, INCLUDING INFORMATION RELATED TO DETERMINING THAT THE SECOND NODE TRANSMITS THE DATA RECEIVED BY THE SECOND NODE, TRANSMITTED BY THE FIRST NODE

METHOD AND DEVICE FOR CONFIGURING NODE TO TRANSMIT AND RECEIVE DATA

CROSS-REFERENCE TO RELATED APPLICATIONS

This application is a 371 National Stage of International Application No. PCT/KR2019/012461, filed Sep. 25, 2019, which claims priority to Chinese Patent Application No. 201811150960.0, filed on Sep. 29, 2018, and Chinese Patent Application No. 201910238909.3, filed on Mar. 27, 2019, the disclosures of which are herein incorporated by reference in their entirety.

BACKGROUND

1. Field

The present disclosure relates to wireless communication technologies, and more particularly to a method and device for configuring a relay node.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The present disclosure provides a method and device for configuring a node to transmit and receive data. Through the above method and device, mapping between the received data and transmitted data of each node in a multi-hop network is realized.

BRIEF DESCRIPTION OF THE DRAWINGS

The above and/or additional aspects and advantageous of the present disclosure will become apparent and be more readily appreciated from the following descriptions of embodiments, with reference to the accompanying drawings, in which:

FIG. 3 is a flowchart of a method for configuring a second node by a first node according to an embodiment of the present disclosure.

FIG. 4 is a flowchart of a method for a second node to receive configuration information of a first node according to an embodiment of the present disclosure.

DETAILED DESCRIPTION

Figure 1:
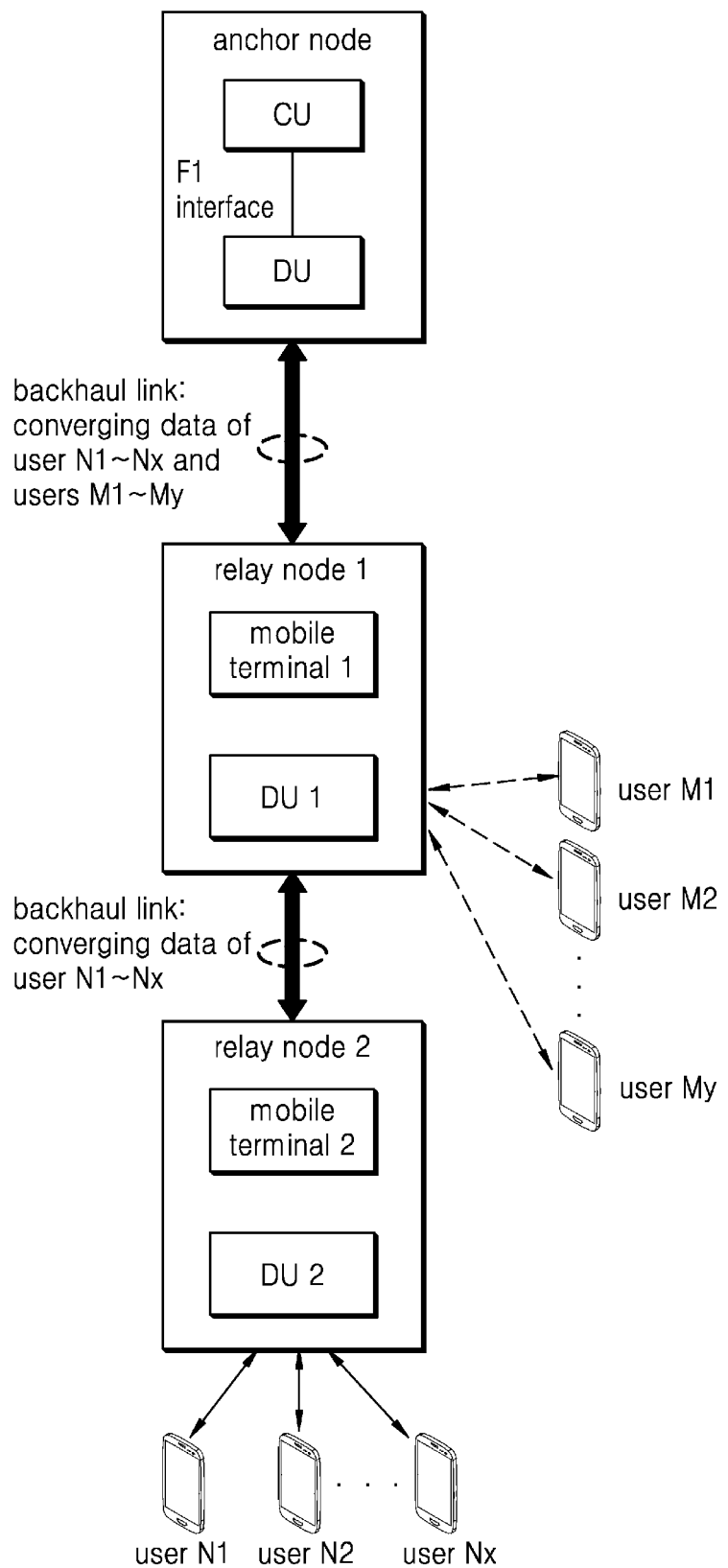
FIG. 1 is an example of a multi-hop network according to an embodiment of the present disclosure.

The present disclosure provides a method and device for configuring a node to transmit and receive data, and implements a channel or radio bearer used by the node to transmit the received data, and performs transmission of the received data.

In one embodiment, a method for configuring a node is provided. The method comprises: receiving, by a second node, a first message transmitted by a first node, wherein the first message comprises at least one of information for determining a channel used by the second node to transmit data received by the second node, or information for determining a radio bearer used by the second node to transmit data received by the second node; and transmitting the received data mapped to at least one of the channel or the radio bearer used to transmit the data.

In one embodiment, the second node comprising a distributed unit (DU) and a mobile terminal.

In one embodiment, the information for determining a channel used by the second node to transmit data received by the second node comprises: at least one of QoS-related information of a backhaul link channel served by the DU of the second node, or QoS-related information of the backhaul link channel served by the mobile terminal of the second node; and wherein the information for determining a radio bearer used by the second node to transmit data received by the second node comprises: at least one of QoS-related information of a user radio bearer served on the backhaul link channel served by the DU of the second node; or QoS-related information of the backhaul link channel served by the mobile terminal of the second node.

In one embodiment, the second node comprises the DU, wherein the information for determining a channel used by the second node to transmit data received by the second node comprises: at least one of QoS-related information of a backhaul link channel served by the second node, or QoS-related information of a user radio bearer; or, wherein the information for determining a channel used by the second node to transmit data received by the second node comprises: QoS-related information of a user radio bearer, the method further comprises: transmitting a response message to the first node, the response message comprises QoS-related information of the backhaul link channel served by the second node.

In one embodiment, the at least one of the information for determining a channel used by the second node to transmit data received by the second node, or the information for determining a radio bearer used by the second node to transmit data received by the second node, comprise one or more items of the following information: identification information of the first node; identification information of the second node; identification information of the user to which the first message is referring; information related to the configuration of the first node; information related to a backhaul link channel served by a DU of the second node; information related to a user radio bearer served on a backhaul link channel served by a DU of the second node; information related to a backhaul link channel served by a mobile terminal of the second node; information related to a user radio bearer on a backhaul link served by a mobile terminal of the second node; information related to configuring a mobile terminal of the second node; indication information related to feedback information that the second node needs to provide.

In one embodiment, the method further comprising: transmitting, by the second node, a response message of the first message to the first node, wherein, the response message comprises one or more items of the following information: identification information of the first node; identification information of the second node; Identification information of the user to which the response message is referring; information related to the configuration of the second node; information related to a user radio bearer accepted by the second node; information related to a backhaul link channel served by the DU of the second node that is able/unable to be accepted by the DU of the second node; information related to a backhaul link channel served by the mobile terminal of the second node that is able/unable to be accepted by the mobile terminal of the second node; a message related to configuring a mobile terminal of the second node.

In one embodiment, the backhaul link channel served by the DU of the second node serves one or more user radio bearers; and/or, the backhaul link channel served by the mobile terminal of the second node serves one or more user radio bearers.

In another embodiment, a method for configuring a node is provided. The method comprises: transmitting, by a first node, a first message to a second message, the first message comprises information for determining a channel used by the second node to transmit data received by the second node, and/or information for determining a radio bearer used by the second node to transmit data received by the second node; and receiving, by the first node, a response message of the first message transmitted by the second node.

In another embodiment, the information for determining a channel used by the second node to transmit data received by the second node, and/or the information for determining a radio bearer used by the second node to transmit data received by the second node, further comprise one or more items of the following information: identification information of the first node; identification information of the second node; identification information of the user to which the first message is referring; information related to the configuration of the first node; information related to a backhaul link channel served by the DU of the second node; information related to a user radio bearer served on a backhaul link channel served by a DU of the second node; information related to a backhaul link channel served by a mobile terminal of the second node; information related to a user radio bearer on a backhaul link served by a mobile terminal of the second node; information related to configuring the mobile terminal of the second node; and indication information related to feedback information that the second node needs to provide.

Accordingly, embodiments disclosed herein provide a second node device, comprising: transceiver; a memory; and at least one processor configured to: receive a first message transmitted by a first node, wherein the first message comprises information for determining a channel used by the second node to transmit data received by the second node, and/or information for determining a radio bearer used by the second node to transmit data received by the second node; and transmit the received data mapped to the channel and/or the radio bearer used to transmit the data.

Accordingly, embodiments disclosed herein provide a first node device, comprising: transceiver; a memory; and at least one processor configured to: transmit a first message to a second message, the first message comprises information for determining a channel used by the second node to transmit data received by the second node, and/or information for determining a radio bearer used by the second node to transmit data received by the second node; receive a response message of the first message transmitted by the second node.

By employing the method and device of the disclosure, a method for the node in the multi-hop network to determine the transmission of the received data is implemented, and the service quality requirement of the user data is ensured.

Hereinafter, preferred embodiments of the present disclosure will be described in detail with reference to the accompanying drawings. In the drawings, although shown in different figures, the same reference numerals are used to refer to the same or similar components. Detailed descriptions of well-known functions and structures incorporated herein are omitted for clarity and conciseness to avoid obscuring the subject matter of the present disclosure.

In order to make the objects, the technical solutions and the advantages of the present disclosure more comprehensible, the present disclosure will be further described in detail below with reference to the accompanying drawings.

In the NR (New Radio access) network or the fifth-generation 5G network, in order to extend the coverage of the network, the IAB (Integrated Access and Backhaul) topic is proposed. The main purpose of the topic is to construct a multi-hop network architecture.

FIG. 1 is an example of a multi-hop network according to an embodiment of the present disclosure.

FIG. 1 shows a schematic architecture of a multi-hop network, which shows a network architecture consisting of an anchor node and two relay nodes. All users eventually communicate with the anchor node, wherein the users N1~Nx communicate with the anchor node via the relay node 2 and the relay node 1, and the users M1-My communicate with the anchor node via the relay node 1. The anchor node may be composed of a central unit (CU) and a distributed unit (DU), wherein the interface between the CU and the DU is an F1 interface (see 3GPP TS 38.473), and the protocol stack included in the CU has: the protocol stack of serving control plane includes a Radio Resource Control (RRC) protocol layer and a Packet Data Convergence Protocol (PDCP) layer, and the protocol stack of serving user plane includes a Service Data Adaptation Protocol (SDAP) layer and a PDCP layer; the protocol stack included in the DU has: the protocol stack of serving control plane and the user plane include a Radio Link Control (RLC) protocol layer, a Medium Access Control (MAC) protocol layer, and a physical layer (PHY). Further, the CU of the anchor node may be an independent entity, or may be an entity containing multiple entities, such as an entity including a control plane (CU-CP: CU-Control Plane) and an entity including one or more user planes (CU-UP: CU-User Plane), the interface between the CU-CP and the CU-UP is an E1 interface, see 3GPP TS38.463. The relay node includes a mobile terminal portion and a DU portion, wherein the mobile terminal portion is configured to communicate with a higher-level node of the relay node (e.g., mobile terminal 1 is configured to communicate with a DU of the anchor node or the anchor node, and mobile terminal 2 is configured to communicate with the DU of the relay node 1), the DU portion is configured to communicate with the next-level node of the relay node (e.g., the DU 1 is configured to communicate with mobile terminal 2, and may also be configured to communicate with the users M1~My, and the DU 2 is configured to communicate with the users N1~Nx). The protocol stack used by the DU portion in the relay node when serving the next-level node may be a complete protocol stack, such as RRC/PDCP/RLC/MAC/PHY used for serving control plane, the SDAP/PDCP/RLC/MAC/PHY layer used for serving user plan; may also be a protocol stack containing a partial protocol layer, such as a protocol stack containing RLC/MAC/PHY, or a protocol stack containing a partial RLC, MAC, and PHY. The protocol stack used by the mobile terminal portion in the relay node when communicating with the higher-level node of the relay node may be a complete protocol stack, such as RRC/PDCP/RLC/MAC/PHY used for serving control plane, the SDAP/PDCP/RLC/MAC/PHY used for serving user plane; may also be a protocol stack containing a partial protocol layer, such as a protocol stack containing RLC/MAC/PHY, or a protocol containing a partial RLC, MAC and PHY. In the entire multi-hop network, the link between the DU 1 and the mobile terminal 2 may also be used to transmit data of the users N1 to Nx, and the link between the DU of the anchor node and the mobile terminal 1 is used to transmit the data of users M1~My and users N1~Nx. Such links have a common feature that the user served by the link accesses the network through another DU (rather than accessing the network via the DU at one end of the link), such as that the user served by the link between the DU and the mobile terminal 1 accesses the network through the DU1 and DU2, the link between the DU1 and the mobile terminal 2 is used to serve the user accessing the network through the DU2. In this disclosure, such link is called backhaul link.

In the LTE/NR network, the transmission of the user data is performed by means of a radio bearer (RB), which may be a data radio bearer (DRB) or a signaling radio bearer (SRB). In the following description of the present disclosure, the DRB will be described as an example. Each user's data is transmitted through one or more DRBs, and each DRB has corresponding QoS parameters. The IAB network also follows this approach, but unlike in the single-hop network, the user's DRB is transmitted on the backhaul link. In order to implement the transmission of different DRBs of the same user or transmission of different DRBs of different users on the backhaul link, the concept of a backhaul link channel is also defined accordingly. An example of a backhaul link channel is a backhaul link Radio Link Control (RLC) Protocol channel, that is, a Backhaul RLC channel, and the entity serving both ends of this channel provide service through RLC/MAC/PHY layer. The backhaul link channel also has corresponding QoS parameters, and one or more backhaul link channels are established on the backhaul link for serving the user's DRB.

Figure 2:
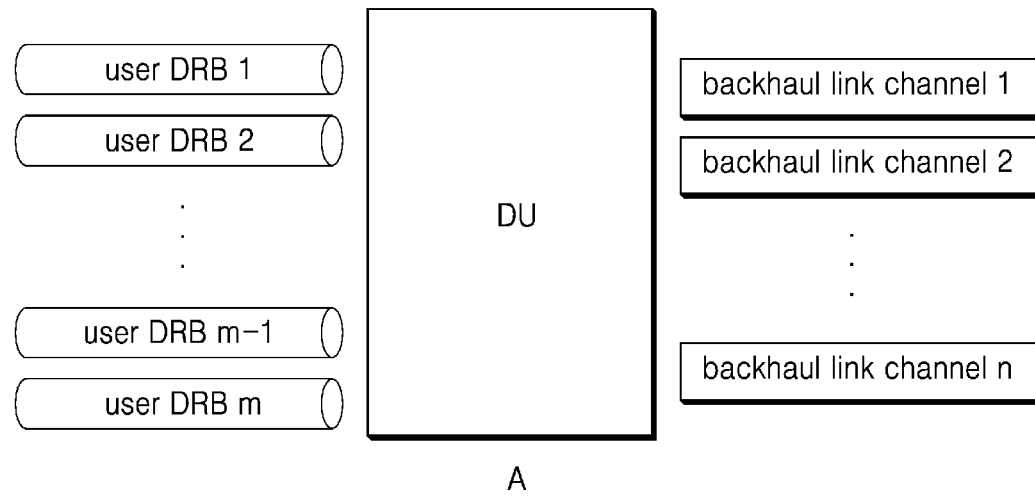
FIG. 2 is a block diagram illustrating a mapping between a user radio bearer and a backhaul link channel and a mapping between backhaul link channels according to an embodiment of the present disclosure.
Figure 2:
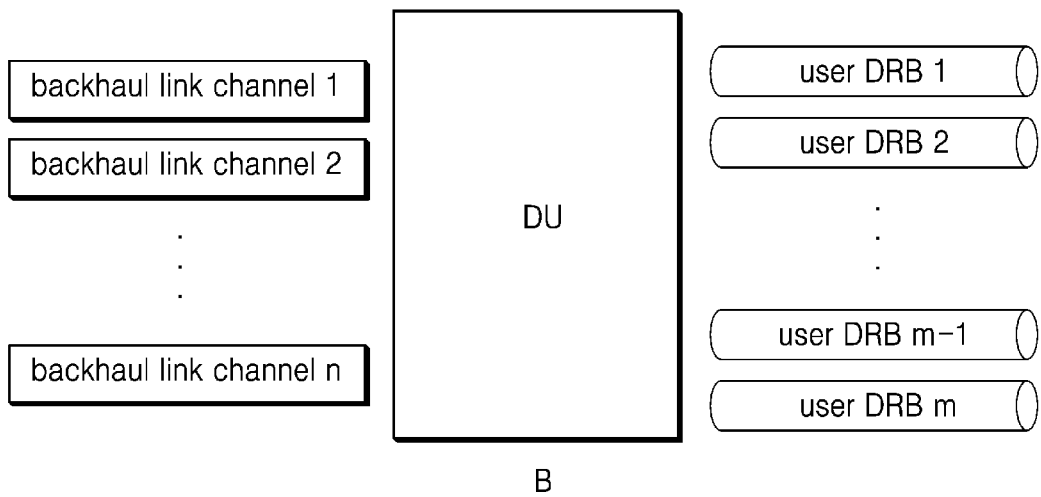
Figure 2:
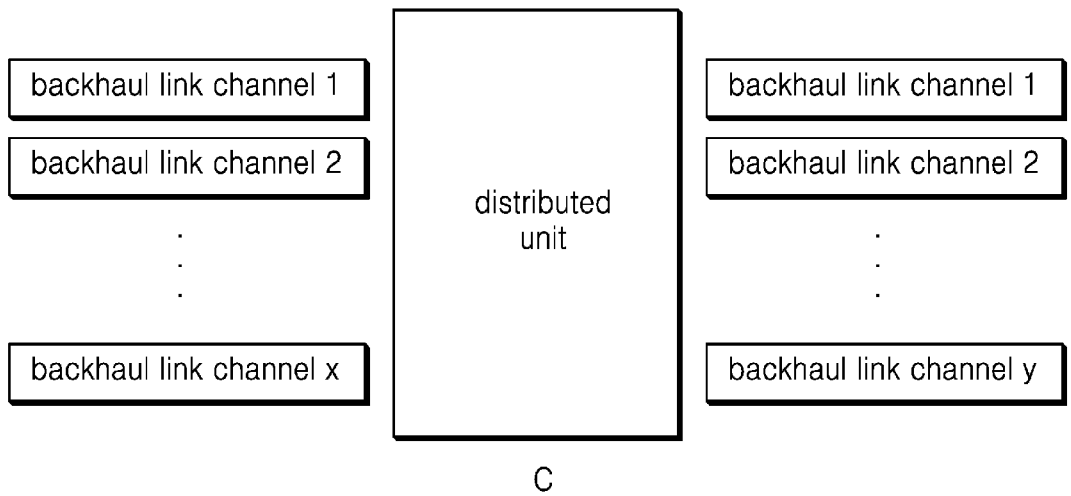

In the IAB network, with the definition of the backhaul link channel, there are two possible mappings:

Mapping between the user's DRB and the backhaul link channel, the mapping includes a mapping from multiple different user DRBs to the same or different multiple backhaul link channels, and also includes the mapping from data packets from one backhaul link channel to one or more different user DRBs. As an example, as shown in FIG. 2(a), the DU in the anchor node of FIG. 1 needs to complete the mapping between the user bearers 1~m and the backhaul link channels 1~n, specifically, if the user's data packet (e.g., downlink data packet) is transmitted from the left side of the DU to the right side, then the DU needs to transmit data packets from different user radio bearers to the channels of different backhaul links, for example, the data packet from the user radio bear 1 needs to be transmitted to the backhaul link channel 2; if the user's data packet (e.g., uplink data packet) is transmitted from the right side of the DU to the left side via the DU, then the DU needs to map the data packets from different backhaul link channels to different user radio bearers, for example, mapping the data packet from the backhaul link to the user radio bearer m. In another example, as shown in the FIG. 2(b), the relay node 2 of FIG. 1 needs to complete the mapping between the backhaul link channels 1~n and the user bearers 1~m. Specifically, if the user's data packet (e.g., downlink data packet) is transmitted from the left side of the relay node 2 to the right side via the relay node 2, then the relay node 2 needs to map the channels from different backhaul links to different user radio bearers, for example, mapping the data packet from the backhaul link channel 2 to the user radio bearer 1; if the user's data packet (e.g., the uplink data packet) is transmitted from the right side of the relay node 2 to the left side, the relay node 2 needs to map the data packets from different user radio bearers onto the different backhaul link channels, for example, mapping the data packet from the user radio bearer m onto the backhaul link 1.

Mapping between the backhaul link channel and the backhaul link channel, the mapping includes a mapping from data packets on one backhaul link channel to one or more different backhaul link channels, and also includes a mapping from data packets on multiple different backhaul link channels to one backhaul link channel. In an example, as shown in FIG. 2(c), the relay node 1 of FIG. 1 needs to complete the mapping between the backhaul link channels 1~x and the backhaul link channels 1~y. Specifically, if the user's data packet (e.g., downlink data packet) is transmitted from the left side of the relay node 1 to the right side via the relay node 1, the relay node 1 needs to map the data from different backhaul link channels of the left side onto the different backhaul link channels of right side, for example, a mapping from the data packet of the backhaul link channel 1 of the left side onto the backhaul link channel 2 of the right side; if the user's data packet (e.g., uplink data packet) is transmitted from the right side of the relay node 1 to the left side via the relay node 1, then the relay node 1 needs to map the data packets from different backhaul link channels of the right side onto the different backhaul link channels of the left side, for example, mapping the data packets from the backhaul link channels of the right side onto the backhaul link channel x of the left side.

In the above and subsequent descriptions of the present disclosure, the user's DRB may be a different DRB of one user, or may be a different DRB of a different user.

The above-mentioned "a mapping between the user's DRB and the backhaul link channel" and "the mapping between the backhaul link channel and the backhaul link channel" may be determined by the CU of the anchor node or the anchor node (centralized mapping method), may also be determined by the nodes serving these user DRBs and the backhaul link channels (distributed mapping method). In the centralized mapping method, the CU of the anchor node or the anchor node will transmit the mapping relationship determined by the CU of the anchor node or the anchor node to the corresponding node, and then the node performs the mapping according to the received mapping relationship, as shown in FIG. 2(a) the mapping relationship is performed by the DU, as in FIG. 2(b) the mapping relationship is performed by the relay node 2, and as shown in FIG. 2(c) is performed by the relay node 1. In the distributed mapping method, the CU of the anchor node or the anchor node needs to provide some assistant information to the node that determines the mapping relationship, so as to make the node which determines the mapping relationship determines the mapping relationship. As shown in FIG. 2(a) the node that determines the mapping relationship is the DU, as shown in FIG. 2(b) the node that determines the mapping relationship is the relay node 2, and as shown in the FIG. 2(c) the node that determines the mapping relationship is the relay node 1. For the distributed method, there is still no mechanism in which the CU of the anchor node or the anchor node provides the auxiliary information for determining the mapping relationship to the node that determines the mapping relationship. The present disclosure provides a method for configuring a node, which is used to help the node to determine the mapping relationship between the DRB and the backhaul link channel, and/or the mapping relationship between the backhaul link channel and the backhaul link channel.

In the following description, the anchor node (donor node) may be a base station, which may be an aggregated base station, or a base station composed of a CU and a DU, and the relay node is a node containing the DU and a mobile terminal. The first node (device) may be a CU of an anchor node or an anchor node, and the second node (device) may be a DU of the anchor node or a relay node. Of course, other naming manners are also possible, and is within the scope of the disclosure.

FIG. 3 shows a flowchart of a method for configuring a DU of an anchor node or a relay node according to an embodiment of the present disclosure. The method may be performed at a first node (an anchor node or a CU of an anchor node).

As shown in FIG. 3, the method includes an operation S310: the first node transmits a message to the second node, which includes information related to determining that the second node transmits the data received by the second node.

In some examples, the message transmitted to the second node includes one or more items of the following information:

Identification information of the first node;
Identification information of the second node;
Identification information of the user to which the message is referring;
Information related to the configuration of the first node, for example, the information related to the configuration of the CU of the first node;
Information related to a backhaul link channel served by a DU of the second node;
Information related to a user radio bearer served on a backhaul link channel served by a DU of the second node;
Information related to a backhaul link channel served by a mobile terminal of the second node;
Information related to a user radio bearer on a backhaul link served by a DU of the second node; and
Information related to a mobile terminal configuring the second node.

The method shown in FIG. 3 may also include receiving a response to the message from the second node, wherein the response includes one or more items of the following information:

Identification information of the first node;
Identification information of the second node;
Identification information of the user to which the message is referring;

Information related to the configuration of the second node, for example, the information related to the configuration of the DU of the second node;

Information related to the user radio bearer accepted by the second node;

Information related to a backhaul link channel served by a DU of the second node that is able or unable to be accepted by the DU of the second node;

Information related to a backhaul link channel served by the mobile terminal of the second node that is able or unable to be accepted by the mobile terminal of the second node; and A message related to a mobile terminal configuring the second node.

FIG. 4 shows a flowchart of a method of configuring a DU of an anchor node or a relay node according to an embodiment of the present disclosure. The method may be performed at a second node (a DU of the anchor node or a relay node).

As shown in FIG. 4, the method includes an operation S410: the second node receives a message including information related to determining that the second node transmits the data received by the second node, transmitted by the first node.

In some examples, the method may also include: transmitting a response to the message, the response includes one or more items of the following information:

Identification information of the first node;
Identification information of the second node;
The identification information of the user to which the message is referring;
Information related to the configuration of the second node, for example, the information related to the configuration of the DU of the second node;
Information related to the user radio bearer accepted by the second node;
Information related to a backhaul link channel served by a DU of the second node that is able or unable to be accepted by the DU of the second node;
Information related to a backhaul link channel served by the mobile terminal of the second node that is able or unable to be accepted by the mobile terminal of the second node; and
A message related to the mobile terminal configuring the second node.

The radio bearer (RB) of the user in the embodiment of the present disclosure may be a data radio bearer (DRB) or a signaling radio bearer (SRB), which represents the data for one user. However, the following description takes the DRB as an example, but the method in the present disclosure may still be applied to the SRB.

The user DRB in the embodiment of the present disclosure may be one or more different DRBs belonging to one user, or may be one or more different DRBs belonging to different users.

Each user DRB or channel of each backhaul link has corresponding QoS-related information in the present disclosure, and the QoS-related information defines at least information about one of the following QoS parameters:

QoS Priority level;
Packet Delay Budget;
Packet Error Rate;
5QI value (5G QoS Identifier);
Delay Critical;
Averaging Window;
Maximum data burst volume;
Allocation and Retention Priority;

GBR QoS flow information, such as Maximum Flow Bit Rate Uplink/Downlink, Guaranteed Flow Bit Rate Uplink/Downlink and Maximum Packet Loss Rate Uplink/Downlink;
Reflective QoS Attribute.

If the DRB or backhaul link channel also contains multiple QoS flows, it also contains QoS parameter information for each QoS flow. The QoS parameter information for the QoS flow also contains at least one of the above QoS information for the DRB or backhaul link channel.

The above definition of QoS parameters may be referred to 3GPP TS38.473 and 3GPP TS23.501. The QoS-related information in the present disclosure is information related to the above QoS parameters.

In the present disclosure, the signaling message of an interaction of two nodes may be interacted by a wired link directly connected between two nodes or a wireless link between two nodes; or may be interacted after forwarding via one or more nodes between the two nodes, and the link used when forwarding via one or more nodes may be the wired or wireless link. In one embodiment, the above wired link may be a wired link serving the F1 interface; in another embodiment, the wireless link may be an air interface of the NR.

Figure 5:
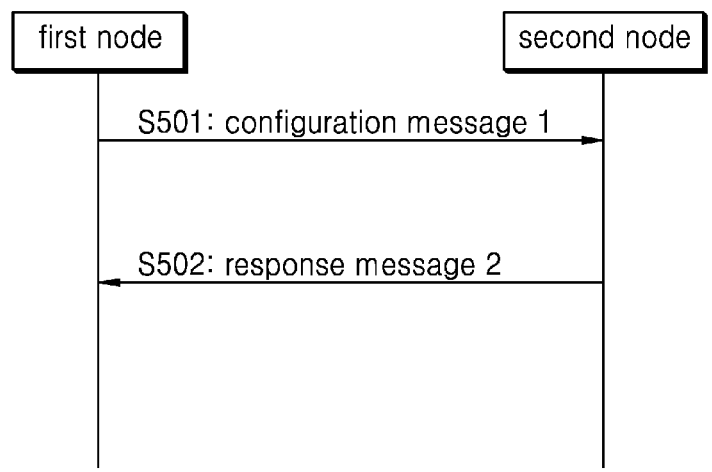
FIG. 5 is a flowchart of the configuration between the first node and the second node according to an embodiment of the present disclosure.

FIG. 5 is a signaling flowchart of inter-node configuration and information related to the determination of the mapping relationship according to an embodiment of the present disclosure, as shown in FIG. 5.

Step S501: The first node transmits a configuration message 1 to the second node, wherein the message 1 contains at least one of the following information:

Identification information of the first node, such as the identifier of the base station, the name of the base station, the identifier of the CU, the name of the CU, etc.;
The identification information of the second node, if the second node is a DU, the identification information may be an identifier of the DU, a name of the DU, and if the second node is a relay node, the identification information may be the identifier of the relay node, the name of the relay node, the identifier of the DU in the relay node, and the identifier of the mobile terminal in the relay node;
The identification information of the user to which the message is referring, the user may be the user served by the DU of the second node, or may be the mobile terminal of another relay node served by the DU of the second node;
Information related to the configuration of the first node, which includes at least one of the following information:
  The content of the system information determined by the first node;
  Information of the RRC version supported by the first node;
  Information of cells which need to be activated by the second node and determined by the first node;
  Information of cells which need to be deactivated by the second node and determined by the first node;
  Added/removed/updated address information of TNL association determined by the first node;
  Information of the disabled cell determined by the first node;
  Information related to LTE and NR resource coordination requests;
  Information of the LTE resources required to be protected;

Indication information transmitted by the system message.

The above information is only an example, and the information related to the configuration of the first node is used to complete the interface management between the first node and the second node. For details, refer to the information (e.g., F1 SETUP RESPONSE message, GNB-DU CONFIGURATION UPDATE ACKNOWLEDGE message, GNB-CU CONFIGURATION UPDATE message, GNB-DU RESOURCE COORDINATION REQUEST message, SYSTEM INFORMATION DELIVERY COMMAND message) contained in the non-UE associated interface management message transmitted by the CU to the DU in the 3GPP TS38.473.

Information related to the DU of the second node, which includes at least one of the following information:
  Identification information of the DU of the second node;
  Information related to the backhaul link channel served by the DU of the second node, the backhaul link channel may be newly created, or may be a backhaul link channel that has been created but needs to be modified, the information includes at least one of the following information:
    Identification information of the backhaul link channel;
    QoS-related information of the backhaul link channel, which may refer to the above "Each user DRB or channel of each backhaul link has corresponding QoS-related information";
    Information of the backhaul link channel served by the mobile terminal of the second node and corresponding to the backhaul link channel served by the DU of the second node, for example, an identifier of the backhaul link channel, which reflects a mapping relationship between the backhaul link channel served by the DU of the second node and the backhaul link channel served by the mobile terminal of the second node;
  Information related to the user DRB served on the backhaul link channel served by the DU of the second node, the user DRB may be newly created, or may have been created but needs to be modified, for a user DRB, the information includes at least one of the following information:
    The user DRB identifier, such as the DRB identifier, the UE identifier, and the UE identifier+DRB identifier, which can be used to identify the identification information of different DRBs of different users.
    Address information of the target receiving node corresponding to the user DRB. In one embodiment, the target receiving node may be a relay node accessed by the user. In another embodiment, the target receiving node may be a DU or a CU of the anchor node serving the user or the anchor node, the address information is used to identify the node that receives the data of the user DRB, which may be a gNB-DU ID, a C-RNTI, an IAB node ID, a gNB-CU ID, an IAB donor ID, a gNB ID, and a cell identity, or may also be newly-defined identification information; further, the information may be configured for one user DRB, or may be configured for one user.
    Address information of the source node corresponding to the user DRB. In one embodiment, the source transmitting node may be a relay node accessed by the user. In another embodiment, the source transmitting node may be a DU or a CU of the anchor node serving the user or the anchor node. The address information is used to identify the node that receives the data of the user DRB, which may be a gNB-DU ID, a C-RNTI, an IAB node ID, a gNB-CU ID, an IAB donor ID, a gNB ID, and a cell identity, or may also be newly-defined identification information; further, the information may be configured for one user DRB or may be configured for one user.
    Path identification information related to transmitting the user DRB data packet, the identification information indicates the node through which the user DRB data packet needs to be transmitted, if there are two paths to transmit the user DRB data packet, path 1 is: a CU of an anchor node→a DU of the anchor node→the relay node 1→the relay node 2 (the relay node accessed by the user), path 2 is: a CU of an anchor node→a DU of the anchor node→the relay node 3→the relay node 2 (the relay node accessed by the user), when the path identification information is 1, it indicates that the transmission path of the user DRB data packet is path 1, and when the path identification information is 2, it indicates that the transmission path of the user DRB data packet is path 2. The path indicated by each path identification information may be pre-configured or configured in this step. If the path is configured in this step, further, the identifier information of each node on the path represented by the path identification information, and the order of the nodes on the path may be included, and when the path 1 is configured, the identification information of the nodes (i.e., the DU of the anchor node, the relay node 1, and the relay node 2) through which the path passes in sequence is configured. Further, the information may be configured for one user DRB or may be configured for one user.
    QoS-related information of the user DRB, refer to the above "Each user DRB or channel of each backhaul link has corresponding QoS-related information";
    Information of the backhaul link channel for serving the user DRB, the information can reflect the correspondence between the user DRB and the backhaul link channel served by the DU of the second node, the information at least includes one of the following information:
      Identification information of the backhaul link channel;
      QoS-related information of the backhaul link channel, which may refer to the above "Each user DRB or channel of each backhaul link has corresponding QoS-related information";
Information related to the mobile terminal of the second node, the information contains at least one of the following information:
  Identification information of the mobile terminal of the second node, for example, C-RNTI;
  Information related to the backhaul link channel served by the mobile terminal of the second node. As shown in FIG. 1, if the second node is the relay node 1, the backhaul link channel served by the mobile terminal of the second node is a backhaul link channel between the DU of the anchor node and the mobile terminal 1 of the relay node 1, if the second node is the relay node 2, the backhaul link channel served by the mobile terminal of the second node is the backhaul link channel between the DU 1 of the relay node 1 and the mobile terminal 2 of the relay node 2. For one backhaul link channels, the information includes at least one of the following information:

Identification information of the backhaul link channel;

The QoS-related information of the backhaul link channel, which may refer to the above "Each user DRB or channel of each backhaul link has corresponding QoS-related information", which is determined by the first node itself or is obtained from other nodes by the first node. For that the information is obtained from other nodes by the first node, one embodiment shown in FIG. 1 is that the QoS information of the backhaul link channel served by the mobile terminal 1 of the relay node 1 (the second node) is obtained from the DU of the anchor node by the CU of the anchor node (the first node); in another embodiment, as shown in FIG. 1, the QoS information of the backhaul link channel served by the mobile terminal 2 of the relay node 2 (the second node) is obtained from the relay node 1 (or the DU1 of the relay node 1) by the CU of the anchor node (the first node).

The maximum acceptable QoS-related information of the backhaul link channel. The QoS-related information may refer to "each user DRB or channel of each backhaul link has corresponding QoS-related information", which is determined by the first node itself or is obtained from other nodes by the first node. For that the information is obtained from other nodes by the first node, one embodiment shown in FIG. 1 is that the QoS information of the backhaul link channel served by the mobile terminal 1 of the relay node 1 (the second node) is obtained from the DU of the anchor node by the CU of the anchor node (the first node); in another embodiment, as shown in FIG. 1, the QoS information of the backhaul link channel served by the mobile terminal 2 of the relay node 2 (the second node) is obtained from the relay node 1 (or the DU1 of the relay node 1) by the CU of the anchor node (the first node).

Information of the backhaul link channel served by the DU of the second node and corresponding to the backhaul link channel served by the mobile terminal of second node, for example, an identifier of the backhaul link channel, which reflects the mapping relationship between the backhaul link channel served by the mobile terminal of the second node and the backhaul link channel served by the DU of the second node;

Information related to the user DRB served on the backhaul link channel, the information can reflect the correspondence between the backhaul link channel served by the mobile terminal of the second node and the user DRB, and the information contains at least one of the following information:

The user DRB identifier, such as the DRB identifier, the UE identifier, and the UE identifier+DRB identifier, which can be used to identify the identification information of different DRBs of different users.

QoS-related information of the user DRB, which may refer to the above "each user DRB or channel of each backhaul link has corresponding QoS-related information";

A message of configuring the mobile terminal of the second node, the message may be an RRC message, such as an RRCReconfiguration message (see 3GPP TS38.331) or an RRCConnectionReconfiguration message (see 3GPP TS36.331), etc., the content of the configuration message may be completely generated by the first node, and may also be partially generated by the first node, and partially generated by other nodes (e.g., DUs in other nodes or DUs in the anchor node) serving the mobile terminal.

Indication information related to the feedback information that the second node needs to provide, the indication information indicates information that the second node needs to feed back to the first node, the indication information at least includes one of the following information:

Indication information for indicating whether it is allowed/needed to provide information related to the backhaul link channel served by the DU of the second node, such as QoS-related information of the backhaul link channel. The indication information may be for one backhaul link channel or for multiple backhaul link channels. Optionally, the indication information includes information for the backhaul link channel (such as identification information of the backhaul link channel). If the indication information indicates "it is not allowed/not needed to provide", the second node does not provide, and if the indication information indicates "it is allowed/needed to provide", the second node can provide. In one embodiment, if the first node provides information related to the backhaul link channel, and the indication information indicates "it is allowed/needed to provide", the second node can provide updated information related to the backhaul link channel; in one embodiment, if the first node provides information related to the backhaul link channel and the indication information indicates "it is allowed/needed to provide", the second node may then provide the updated information when it is necessary to update the information related to the backhaul link channel; in one embodiment, if the first node provides information related to the backhaul link channel and the indication information indicates "it is allowed/needed to provide", the second node may provide the first node with the information related to the QoS of the backhaul link channel that may be accepted by the second node while the QoS-related information provided by the first node cannot be satisfied. Further, for one or more backhaul link channel, the indication information may further include minimum QoS-related information of the backhaul link channel that needs to be satisfied by the second node. In one embodiment, the information may be used as a reference when the second node generates QoS-related information of the backhaul link channel.

Indication information for indicating whether it is allowed/needed to provide a mapping relationship between the backhaul link served by the DU of the second node and the UE DRB. The indication information may be for one backhaul link channel or for multiple backhaul link channels. Optionally, the indication information includes information about one or more backhaul link channels (such as identification information of the backhaul link channel). If the indication information indicates "it is not allowed/needed to provide", the second node does not need to provide, and if the indication information indicates "it is allowed/needed to provide", the second node can provide. In one embodiment, if the first node provides the mapping relationship and the indication information indicates "it is allowed/needed to provide", the second node may provide the updated mapping relationship; and in one embodiment, if the first node provides the mapping relationship and the indication information indicates "it is allowed/needed to provide", then the second node may provide the updated information when it is necessary to update the mapping relationship; in one embodiment, if the first node provides the mapping relationship and the indication information indicates "it is allowed/needed to provide", then the second node may provide the first node with the mapping relationship that may be accepted by the second node when the mapping relationship provided by the first node cannot be satisfied.

Indication information for indicating whether it is allowed/needed to provide a mapping relationship between a backhaul link served by the DU of the second node and a backhaul link served by the mobile terminal of the second node. The indication information may be for one or more backhaul link channel served by the DU or one or more backhaul link channel served by the mobile terminal. Optionally, the indication information may include information for one or more backhaul link channels (such as identification information of the backhaul link channel). If the indication information indicates "it is not allowed/needed to provide", the second node does not need to provide, and if the indication information indicates "it is allowed/needed to provide", the second node may provide. In one embodiment, if the first node provides the mapping relationship and the indication information indicates "it is allowed/needed to provide", the second node may provide the updated mapping relationship; in one embodiment, if the first node provides the mapping relationship, and the indication information indicates "it is allowed/needed to provide", then the second node may provide updated information when it is necessary to update the mapping relationship; in one embodiment, if the first node provides the mapping relationship, and the indication information indicates "it is allowed/needed to provide", then the second node may provide the first node with a mapping relationship that may be accepted by the second node when the mapping relationship provided by the first node cannot be satisfied.

Step S502: the second node transmits a response message 2 to the first node, wherein the message 2 contains at least one of the following information:

Identification information of the first node, such as an identifier of the base station, the name of the base station, an identifier of the CU, the name of the CU, etc.;

The identification information of the second node, if the second node is the DU, the identification information may be an identifier of the DU and a name of the DU, and if the second node is a relay node, the identification information may be an identifier of the relay node, a name of the relay node, an identifier of the DU in the relay node, and an identifier of the mobile terminal in the relay node;

The identification information of the user to which the message is referring, the user may be the user served by the DU of the second node, or may be the mobile terminal of another relay node served by the DU of the second node;

Information related to the configuration of the second node, the information includes at least one of the following information:
　Information related to the cell served by the DU of the second node;
　Information related to system information determined by the DU of the second node;
　RRC version information of the DU of the second node;
　Status information of the cell served by the second node, such as active, inactive, shutting down, etc.;
　Information of the cell deleted by the DU of the second node;
　Information of the cell modified by the DU of the second node;
　Information of the cell added by the DU of the second node;
　Information of the cell that cannot be activated by the DU of the second node;
　Address information of TNL association that can/cannot be added at the DU of the second node;
　Information related to LTE and NR resource coordination responses;
　Information related to the load of the DU of the second node;

The above information is only an example, and the information related to the configuration of the second node is used to complete the interface management between the first node and the second node. The details can be referring to the information contained in the non-UE associated interface management message transmitted by the DU to the CU in the 3GPP TS38.473 (such as F1 SETUP REQUEST message, GNB-DU CONFIGURATION UPDATE message, GNB-CU CONFIGURATION UPDATE ACKNOWLEDGE message, GNB-DU RESOURCE COORDINATION RESPONSE message, GNB-DU STATUS INDICATION message).

Information related to the user DRB accepted by the second node, such as an identifier of the user DRB;

Information related to the DU of the second node, which includes at least one of the following information:
　Information related to the backhaul link channel served by the DU of the second node that is able or unable to be accepted by the DU of the second node, the information includes at least the following information:
　　For the information related to the backhaul link channel accepted by the DU of the second node, the backhaul link channel may be newly created, or may have been created but needs to be modified, the information includes at least the following information:
　　　Identification information of the backhaul link channel;
　　　QoS-related information of the backhaul link channel generated by the second node, wherein the information may be directly generated by the second node, or may be suggested after referring to the QoS-related information for the backhaul link channel transmitted by the first node; the QoS-related information may refer to "each user DRB or channel of each backhaul link has corresponding QoS-related information"; further, in an embodiment, the second node may determine whether to contain the information according to the "Indication information related to the feedback information that the second node needs to provide" transmitted by the first node.

The maximum acceptable QoS-related information of the backhaul link channel generated by the second node. The difference between the information and "the QoS-related information of the backhaul link channel generated by the second node" is that the first node may determine the user DRB that may be additionally accepted by the backhaul link channel after obtaining the information, and the above "QoS-related information of the backhaul link channel generated by the second node" indicates the QoS-related information that can be satisfied by the user DRB in the current network. The QoS-related information may refer to "each user DRB or channel of each backhaul link channel have corresponding QoS-related information";

Information of the backhaul link channel served by the mobile terminal of the second node corresponding to the backhaul link channel served by DU of the second node, for example, the identifier of the backhaul link channel, which reflects the mapping relationship between the backhaul link channel served by the DU of the second node and the backhaul link channel served by the mobile terminal of the second node; further, in an embodiment, the second node may determine whether to contain the information according to the "indication information related to the feedback information that the second node needs to provide" transmitted by the first node.

Information related to the user DRB served by the backhaul link channel, for example, the identification information of the user DRB; further, in an embodiment, the second node may determine whether to contain the information according to the "indication information related to the feedback information that the second node needs to provide" transmitted by the first node.

For the information related to the backhaul link channel that cannot be accepted by the DU of the second node, the backhaul link channel may be newly created, or may be the backhaul link channel that has been created but needs to be modified, and the information includes at least one of the following information:

Identification information of the backhaul link channel;

QoS-related information of the backhaul link channel suggested by the second node. The QoS-related information may refer to "each user DRB or channel of each backhaul link has corresponding QoS-related information". Further, in an embodiment, the second node may determine whether to contain the information according to the "indication information related to the feedback information that the second node needs to provide" transmitted by the first node.

Configuration information of other nodes (e.g., users, mobile terminals of other relay nodes) served by the DU of the second node, for example, Cell group configuration, see 3GPP TS38.331; In an embodiment, configuration information of a backhaul link channel served by a DU of the second node (such as an RLC layer configuration, a MAC layer configuration, a PHY layer configuration, etc.) may also be included.

Information related to the mobile terminal of the second node, the information includes at least one of the following information:

Information related to a backhaul link channel served by the mobile terminal of the second node that is able or unable to be accepted by the mobile terminal of the second node, the information includes at least one of the following information:

Information related to a backhaul link channel served by the mobile terminal of the second node that is able to be accepted by the mobile terminal of the second node, the information includes at least one of the following information:

Identification information of the backhaul link channel;

QoS-related information of the backhaul link channel generated by the second node, wherein the information may be directly generated by the second node, or may be generated after referring to the QoS-related information for the backhaul link channel transmitted by the first node. The QoS-related information may refer to "each user DRB or the channel of each backhaul link have corresponding QoS-related information";

Information of the backhaul link channel served by the DU of the second node and corresponding to the backhaul link channel served by mobile terminal of the second node, for example, an identifier of the backhaul link channel, which reflects the mapping relationship between the backhaul link channel served by the mobile terminal of the second node and the backhaul link channel served by the DU of the second node;

Information related to the user DRB served by the backhaul link channel, for example, the user DRB identifier;

Information related to the backhaul link channel served by the mobile terminal of the second node that cannot be accepted by the mobile terminal of the second node, the information includes at least one of the following information:

Identification information of the backhaul link channel;

QoS-related information of the backhaul link channel suggested by the second node. The QoS-related information may refer to "each user DRB or the channel of each backhaul link has corresponding QoS-related information";

The message related to configuring the mobile terminal of the second node, the message may be an RRC message, such as an RRCReconfigurationComplete message (see 3GPP TS38.331) or an RRCConnectionReconfigurationComplete message (see 3GPP TS36.331), etc., the message may be a response message to the RRC message received in the configuration message 1, may also be the RRC message generated by the mobile terminal of the second node (the message does not need to be transmitted after receiving the RRC message transmitted by the first node).

In the above process, the configuration message 1 may be a UE Context Setup/Modification Request message used on an existing F1 interface, or may be a newly defined message, such as a relay node Context Setup/Modification Request message, and the response message may be The UE Context Setup/Modification Response message used on the existing F1 interface, and may also be a newly defined message, for example, a relay node Context Setup/Modification Response message. The above message names are just examples and other names may be used.

Through the above process, the configuration of the second node may be completed, so that the second node may determine and perform a mapping between the user DRB and the backhaul link channel, or the mapping between the backhaul served by the DU of the second node and the backhaul link channel served by the mobile terminal of the second node, which realizing the flexible satisfaction of the QoS requirements of the relay nodes in the multi-hop network, and allowing the relay node to change the policy satisfying the QoS requirements on the remaining paths according to the QoS satisfaction of the user data packets on the already transmitted path.

Embodiment 1 (Interface Management Between a First Node and a Second Node Initiated by a First Node)

Figure 6:
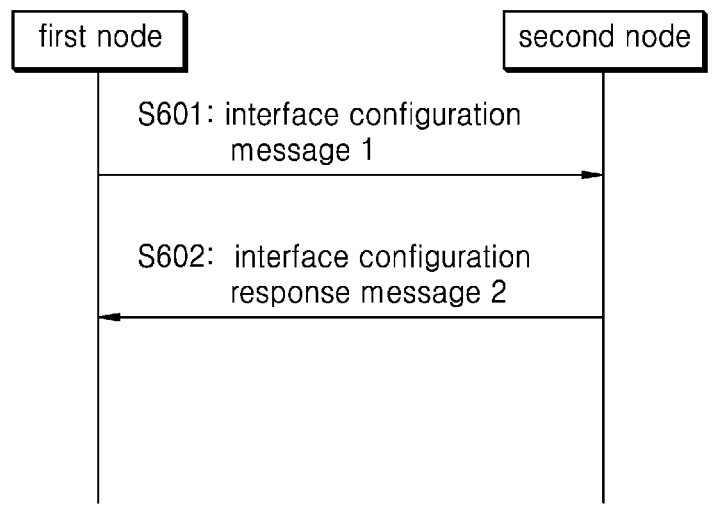
FIG. 6 is a flowchart of an interface configuration initiated by a first node according to an embodiment of the present disclosure.

The above process in FIG. 5 may be used to perform the interface management between the CU of the first node and the DU of the second node initiated by the first node, as shown in FIG. 6, the above process is:

Step S601: the first node transmits an interface configuration message 1 to the second node, wherein the configuration message 1 contains some information related to the configuration of the first node, and the message contains at least one of the following information:
  Identification information of the first node, such as an identifier of the base station, a name of the base station, an identifier of the CU, a name of the CU, etc.;
  The identification information of the second node, if the second node is the DU, the identification information may be an identifier of the DU, a name of the DU, and if the second node is a relay node, the identification information may be an identifier of the relay node, a name of the relay node, an identifier of the DU in the relay node, and an identifier of the mobile terminal in the relay node;
  Information related to the configuration of the first node, which includes at least one of the following information:
    The content of the system information determined by the first node;
    Information of the RRC version supported by the first node;
    Information of cells which need to be activated by the second node and determined by the first node;
    Information of cells which need to be deactivated by the second node and determined by the first node;
    Added/removed/updated address information of TNL association determined by the first node;
    Information of the disabled cell determined by the first node;
    Information related to LTE and NR resource coordination requests;
    Information of the LTE resources required to be protected;
    Indication information transmitted by the system message.

The above information is only an example, and the information related to the configuration of the first node is used to complete the interface management between the first node and the second node. For details, refer to the information (such as F1 SETUP RESPONSE message, GNB-DU CONFIGURATION UPDATE ACKNOWLEDGE message, GNB-CU CONFIGURATION UPDATE message, GNB-DU RESOURCE COORDINATION REQUEST message, SYSTEM INFORMATION DELIVERY COMMAND message) contained in the non-UE associated interface management message transmitted by the CU to the DU in 3GPP TS38.473.

Step S602: the second node transmits an interface configuration response message 2 to the first node, wherein the response message contains information related to a configuration of the DU of the second node, and the message contains at least one of the following information:
  Identification information of the first node, such as an identifier of the base station, a name of the base station, an identifier of the CU, the name of the CU, etc.;
  The identification information of the second node, if the second node is the DU, the identification information may be an identifier of the DU and a name of the DU, and if the second node is a relay node, the identification information may be an identifier of the relay node, a name of the relay node, an identifier of the DU in the relay node, and an identifier of the mobile terminal in the relay node;
  Information related to the configuration of the second node, the information includes at least one of the following information:
    Information related to the cell served by the DU of the second node;
    Information related to system information determined by the DU of the second node;
    RRC version information of the DU of the second node;
    Status information of the cell served by the second node, such as active, inactive, shutting down, etc.;
    Information of the cell deleted by the DU of the second node;
    Information of the cell modified by the DU of the second node;
    Information of the cell added by the DU of the second node;
    Information of the cell that cannot be activated by the DU of the second node;
    Address information of TNL association that can/cannot be added at the DU of the second node;
    Information related to LTE and NR resource coordination responses;
    Information related to the load of the DU of the second node.

The above information is only an example, and the information related to the configuration of the second node is used to complete the interface management between the first node and the second node. The details can be referring to the information contained in the non-UE associated interface management message transmitted by the CU to the DU in the 3GPP TS38.473 (such as F1 SETUP REQUEST message, GNB-DU CONFIGURATION UPDATE message, GNB-CU CONFIGURATION UPDATE ACKNOWLEDGE message, GNB-DU RESOURCE COORDINATION RESPONSE message, GNB-DU STATUS INDICATION message).

Embodiment 2 (Interface Management Between the First Node and the Second Node Initiated by the Second Node)

Figure 7:
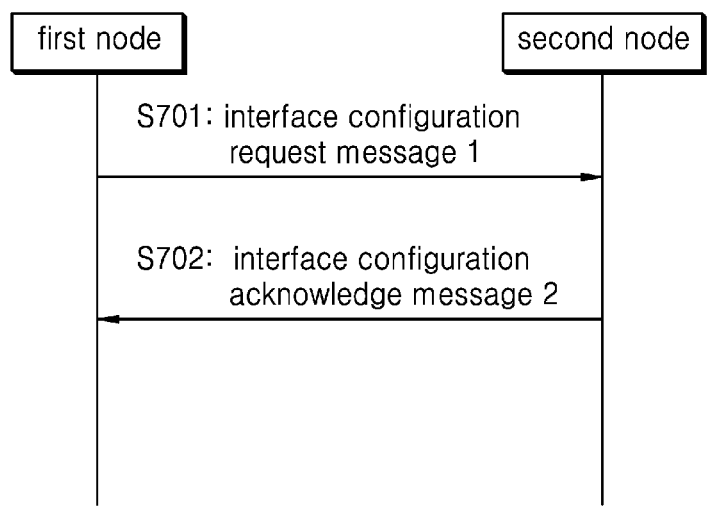
FIG. 7 is a flowchart of an interface configuration initiated by a second node according to an embodiment of the present disclosure.

In order to perform interface management between the first node and the second node, the second node may also initiate an interface management related process, as shown in FIG. 7, the process is:

Step S701: The second node transmits an interface configuration request message 1 to the first node, wherein the configuration request message contains information related to a configuration of the DU of the second node, and the message contains at least one of the following information:

Identification information of the first node, such as an identifier of the base station, a name of the base station, an identifier of the CU, a name of the CU, etc.;

The identification information of the second node, if the second node is the DU, the identification information may be an identifier of the DU, a name of the DU, and if the second node is a relay node, the identification information may be an identifier of the relay node, a name of the relay node, an identifier of the DU in the relay node, and an identifier of the mobile terminal in the relay node;

Information related to the configuration of the second node, which includes at least one of the following information:

Information related to the cell served by the DU of the second node;

Information related to system information determined by the DU of the second node;

RRC version information of the DU of the second node;

Status information of the cell served by the second node, such as active, inactive, shutting down, etc.;

Information of the cell deleted by the DU of the second node;

Information of the cell modified by the DU of the second node;

Information of the cell added by the DU of the second node;

Information of the cell that cannot be activated by the DU of the second node;

Address information of TNL association that can/cannot be added at the DU of the second node;

Information related to LTE and NR resource coordination responses;

Information related to the load of the DU of the second node.

The above information is only an example, and the information related to the configuration of the first node is used to complete the interface management between the first node and the second node. The details can be referring to the information contained in the non-UE associated interface management message transmitted by the CU to the DU in 3GPP TS38.473 (such as F1 SETUP RESPONSE message, GNB-DU CONFIGURATION UPDATE message, GNB-CU CONFIGURATION UPDATE ACKNOWLEDGE message, GNB-DU RESOURCE COORDINATION REQUEST message, GNB-DU STATUS INDICATION message).

Step S702: The first node transmits an interface configuration acknowledge message 2 to the second node, wherein the configuration response message 2 includes some information related to the configuration of the first node, and the message contains at least one of the following information:

Identification information of the first node, such as an identifier of the base station, a name of the base station, an identifier of the CU, a name of the CU, etc.;

The identification information of the second node, if the second node is the DU, the identification information may be an identifier of the DU and a name of the DU, and if the second node is a relay node, the identification information may be an identifier of the relay node, a name of the relay node, an identifier of the DU in the relay node, and an identifier of the mobile terminal in the relay node;

Information related to the configuration of the first node, the information includes at least one of the following information:

The content of the system information determined by the first node;

Information of the RRC version supported by the first node;

Information of cells which need to be activated by the second node and determined by the first node;

Information of cells which need to be deactivated by the second node and determined by the first node;

Added/removed/updated address information of TNL association determined by the first node;

Information of the disabled cell determined by the first node;

Information related to LTE and NR resource coordination requests;

Information of the LTE resources needs to be protected;

Indication information transmitted by the system message.

The above information is only an example, and the information related to the configuration of the first node is used to complete the interface management between the first node and the second node. The details can be referring to the information contained in the non-UE associated interface management message transmitted by the CU to the DU in the 3GPP TS38.473 (such as F1 SETUP REQUEST message, GNB-DU CONFIGURATION UPDATE ACKNOWLEDGE message, GNB-CU CONFIGURATION UPDATE message, GNB-DU RESOURCE COORDINATION RESPONSE message, SYSTEM INFORMATION DELIVERY COMMAND message).

Hereafter, the specific implementation methods of the above steps S501 and S502 are respectively introduced for different second nodes. In the following description, in order to avoid repetition, the specific content of the information contained in each message may be referred to the contents of the information contained in the above steps S501 and S502. In addition, the following information that may be contained in the configuration message 1 and the response message 2, such as the identification information of the first node, the identification information of the second node, and the identification information of the user to which the message is referring, will not be different depending on the method used. Therefore, it is omitted in the introduction.

Embodiment 3 (when the Second Node is the DU
of the Anchor Node of FIG. 1, the Configuration
Process Between the First Node and the Second
Node)

When the second node is the DU of the anchor node in FIG. 1, the flow between the first node and the second node, as shown in FIG. 5, may help the second node to determine the mapping between the user DRB and the backhaul link channel served by the DU of the second node, the method implemented by the flow includes:

Method 1 (the second node is a DU of the anchor node): the first node provides information related to the user DRB to the second node, and the second node determines information (the backhaul link is served by the DU of the second node) related to backhaul link channel serving user DRB, the second node determines the mapping of the user DRB and the backhaul link channel served by the DU of the second node based on the above information:

The configuration message 1 in the above step S501 contains at least one of the following information:
  Information related to the DU of the second node, which includes at least one of the following information:
    Identification information of the DU of the second node;
    Information related to a new or existing user DRB served on the backhaul link served by the DU of the second node, for one user DRB, the information includes at least one of the following information:
    User DRB identifier;
    QoS-related Information of the user DRB.
    Address information of the target receiving node corresponding to the user DRB, referring to the description of the information in the present disclosure;
    Address information of the source node corresponding to the user DRB, referring to the description of the information in the present disclosure;
    Path identification information related to transmitting the user DRB data packet, referring to the description of the information in the present disclosure;
  The indication information related to the feedback information that the second node needs to provide, referring to the relevant description in the present disclosure.

The response message 2 in the above step S502 contains at least one of the following information:
  Information related to the user DRB accepted by the second node, for example, an identifier of the user DRB;
  Information related to the DU of the second node, which includes at least one of the following information:
    Information related to the backhaul link channel served by the DU of the second node that is able or unable to be accepted by the DU of the second node, the information includes at least one of the following information:
      For the information related to the accepted backhaul link channel, the information includes at least one of the following information:
        Identification information of the backhaul link channel;
        QoS-related information of the backhaul link channel generated by the second node; further, in an embodiment, the second node may determine whether to contain the information according to the "indication information related to the feedback information that the second node needs to provide" transmitted by the first node
        The maximum acceptable QoS-related information of the backhaul link channel generated by the second node;
        Information related to the user DRB served by the backhaul link channel, for example, the identification information of the user DRB. Further, in an embodiment, the second node may determine whether to contain the information according to the "indication information related to the feedback information that the second node needs to provide" transmitted by the first node.
      For the information related to the backhaul link channel that cannot be accepted by the DU of the second node, the information includes at least one of the following information:
        Identification information of the backhaul link channel;
        QoS-related information of the backhaul link channel suggested by the second node. Further, in an embodiment, the second node may determine whether to contain the information according to the "indication information related to the feedback information that the second node needs to provide" transmitted by the first node.
    Configuration information of other nodes (such as users, mobile terminals of other relay nodes) served by the DU of the second node, for example, Cell group configuration, see 3GPP TS38.331. In an embodiment, configuration information (such as an RLC layer configuration, a MAC layer configuration, a PHY layer configuration, etc.) of a backhaul link channel served by a DU of the second node may also be included.

Method 2 (the second node is a DU of the anchor node): the first node provides information related to the user DRB and information related to the backhaul link channel served by the DU of the second node to the second node, and the second node determines the mapping of the user DRB and the backhaul link channel served by the DU of the second node based on the above information:

The configuration message 1 of the above step S501 contains at least one of the following information:
  Information related to the DU of the second node, which includes at least one of the following information:
    Identification information of the DU of the second node;
    Information related to a new or existing backhaul link channel served by the DU of the second node, the information includes at least one of the following information:
      Identification information of the backhaul link channel;
      QoS-related Information of the backhaul link channel.
    Information related to the new or existing user DRB served on the backhaul link served by the DU of the second node, for one user DRB, the information includes at least one of the following information:
      User DRB identifier;
      QoS-related information of the user DRB;

Address information of the target receiving node corresponding to the user DRB, referring to the description of the information in the present disclosure;

Address information of the source node corresponding to the user DRB, referring to the description of the information in the present disclosure;

Path identification information related to transmitting the user DRB data packet, referring to the description of the information in the present disclosure.

Indication information related to the feedback information that the second node needs to provide, referring to the description of the above indication information in the present disclosure.

The information contained in the response message 2 in the above step S502 refers to the method 1 in Embodiment 3. Further, in an embodiment, the second node may determine the information needs to be contained according to the "indication information related to the feedback information that the second node needs to provide" transmitted by the first node.

Method 3 (the second node is a DU of the anchor node): the first node provides the second node with information related to the user DRB, and the mapping relationship between the user DRB and the backhaul link channel served by the DU of the second node, and the second node determines information related to the backhaul link channel served by the DU of the second node according to the above information:

The configuration message 1 of the above step S501 includes at least one of the following information:

Information related to the DU of the second node, which includes at least one of the following information:
Identification information of the DU of the second node;
Information related to a new or existing backhaul link channel served by the DU of the second node, the information includes at least one of the following information:
Identification information of the backhaul link channel;
Information related to the user DRB served by the backhaul link channel, for example, the identification information of the user DRB;

Information related to the new or existing user DRB served on the backhaul link served by the DU of the second node, for one user DRB, the information includes at least one of the following information:
User DRB identifier;
QoS-related information of the user DRB;
Address information of the target receiving node corresponding to the user DRB, referring to the description of the information in the present disclosure;
Address information of the source node corresponding to the user DRB, referring to the description of the information in the present disclosure;
Path identification information related to transmitting the user DRB data packet, referring to the description of the information in the present disclosure;
Information of the backhaul link channel for serving the user DRB, the information can reflect the correspondence between the user DRB and the backhaul link channel served by the DU of the second node, for example, the identification information of the backhaul link channel.

Indication information related to the feedback information that the second node needs to provide, referring to the description of the above indication information in the present disclosure.

The information containing in the response information 2 in step S502 refers to method 1 of embodiment 3. Further, in one embodiment, the second node may determine the contained information according to "the indication information related to the feedback information that the second node needs to provide transmitted by the first node".

Method 4 (the second node is the DU of the anchor node), the above flow in FIG. 5 may also be applied to a centralized mapping method in which the first node determines the mapping between the user DRB and the backhaul link channel served by the DU of the second node:

In the method, the configuration message 1 in the above step S501 contains at least one of the following information:

Information related to the DU of the second node, which includes at least one of the following information:
Identification information of the DU of the second node;
Information related to a new or existing backhaul link channel served by the DU of the second node, the information includes at least one of the following information:
Identification information of the backhaul link channel;
QoS-related information of the backhaul link channel;
Information related to the user DRB served by the backhaul link channel, for example, the identification information of the user DRB.

Information related to the new or existing user DRB served on the backhaul link served by the DU of the second node, for one user DRB, the information includes at least one of the following information:
User DRB identifier;
QoS-related information of the user DRB;
Address information of the target receiving node corresponding to the user DRB, referring to the description of the information in the present disclosure;
Address information of the source node corresponding to the user DRB, referring to the description of the information in the present disclosure;
Path identification information related to transmitting the user DRB data packet, referring to the description of the information in the present disclosure;
Information of the backhaul link channel for serving the user DRB, the information can reflect the correspondence between the user DRB and the backhaul link channel served by the DU of the second node, for example, the identification information of the backhaul link channel.

Indication information related to the feedback information that the second node needs to provide, refers to the description of the above indication information in the present disclosure.

The information contained in the response message 2 in the above step S502 refers to the method 1 in Embodiment 3. Further, in an embodiment, the second node may determine the contained information according to the "indication information related to the feedback information that the second node needs to provide" transmitted by the first node.

Embodiment 4 (when the Second Node is the
Relay Node 1 in FIG. 1, the Configuration Flow
Between the First Node and the Second Node)

When the second node is the relay node 1 in FIG. 1, the flow between the first node and the second node, as shown in FIG. 5, may help the second node to determine the mapping between the backhaul link channel served by the mobile terminal of the second node and the backhaul link channel served by the DU of the second node, the method implemented by the flow includes:

Method 1 (the second node is relay node 1): the first node provides information related to the user DRB to the second node, and the second node determines information (the backhaul link is served by the DU of the second node) related to backhaul link channel serving user DRB, the mapping relationship between the UE DRB and the backhaul link channel served by the DU of the second node, and the mapping between the backhaul link channel served by the mobile terminal of the second node and the backhaul link channel served by the DU of the second node:

The configuration message 1 in the above step S501 includes at least one of the following information:
Information related to the DU of the second node, which includes at least one of the following information:
Identification information of the DU of the second node;
Information related to the new or existing user DRB served on the backhaul link served by the DU of the second node, for one user DRB, the information includes at least one of the following information:
User DRB identifier;
QoS-related information of the user DRB;
Information related to the mobile terminal of the second node, the information contains at least one of the following information:
Identification information of the mobile terminal of the second node;
Information related to the backhaul link channel served by the mobile terminal of the second node, for one backhaul link channels, the information includes at least one of the following information:
Identification information of the backhaul link channel;
QoS-related information of the backhaul link channel;
The maximum acceptable QoS-related information of the backhaul link channel;
Information related to the user DRB served on the backhaul link channel, the information can reflect the correspondence between the backhaul link channel served by the mobile terminal of the second node and the user DRB, and the information contains at least one of the following information:
User DRB identifier;
QoS-related information of the user DRB;
Address information of the target receiving node corresponding to the user DRB, referring to the description of the information in the present disclosure;
Address information of the source node corresponding to the user DRB, referring to the description of the information in the present disclosure;
Path identification information related to transmitting the user DRB data packet, referring to the description of the information in the present disclosure;
Message of configuring the mobile terminal of the second node;
Indication information related to the feedback information that the second node needs to provide, refers to the description of the information in the present disclosure The response message 2 in the above step S502 contains at least one of the following information:
Information related to the user DRB accepted by the second node;
Information related to the DU of the second node, which includes at least one of the following information:
Information related to the backhaul link channel served by the DU of the second node that is able or unable to be accepted by the DU of the second node, the information includes at least one of the following information:
For information related to the accepted new or existing backhaul link channel, the information includes at least one of the following information
Identification information of the backhaul link channel;
QoS-related information of the backhaul link channel generated by the second node; further, in an embodiment, the second node may determine the contained information according to the "indication information related to the feedback information that the second node needs to provide" transmitted by the first node.
The maximum acceptable QoS-related information of the backhaul link channel generated by the second node;
Information of the backhaul link channel served by the mobile terminal of the second node corresponding to the backhaul link channel served by DU of the second node, for example, an identifier of the backhaul link channel, which reflects a mapping relationship between the backhaul link channel served by the DU of the second node and the backhaul link channel served by the mobile terminal of the second node; Further, in an embodiment, the second node may determine the contained information according to the "indication information related to the feedback information that the second node needs to provide" transmitted by the first node.
Information related to the user DRB served by the backhaul link channel, for example, the identification information of the user DRB. Further, in an embodiment, the second node may determine the contained information according to the "indication information related to the feedback information that the second node needs to provide" transmitted by the first node.
For information related to new or existing backhaul link channels that are not accepted, the information includes at least one of the following:
Identification information of the backhaul link channel;
QoS-related information of the backhaul link channel suggested by the second node. Further, in an embodiment, the second node may determine the contained information according to the "indication information related to the feedback information that the second node needs to provide" transmitted by the first node.
  Configuration information of other nodes (such as users, mobile terminals of other relay nodes) served by the DU of the second node, for example, Cell group configuration, see 3GPP TS38.331; in an embodiment, the configuration information (such as an RLC layer configuration, a MAC layer configuration, a PHY layer configuration, etc.) of the backhaul link channel served by the DU of the second node may be included.
Information related to the mobile terminal of the second node, the information includes at least one of the following information:
  Information related to a backhaul link channel served by the mobile terminal of the second node that is able or unable to be accepted by the mobile terminal of the second node, the information includes at least one of the following information:
    For information related to the backhaul link channel served by the mobile terminal of the second node that may be accepted, the information includes at least one of the following information:
      Identification information of the backhaul link channel;
      QoS-related information of the backhaul link channel generated by the second node;
      Information of the backhaul link channel served by the DU of the second node corresponding to the backhaul link channel served by the mobile terminal of the second node, for example, an identifier of the backhaul link channel, which reflects a mapping relationship between the backhaul link channel served by the mobile terminal of the second node and the backhaul link channel served by the DU of the second node;
      Information related to the user DRB served by the backhaul link channel, for example, the user DRB identifier.
    For information related to a backhaul link channel served by the mobile terminal that cannot be accepted, the information includes at least one of the following information:
      Identification information of the backhaul link channel;
      QoS-related information of the backhaul link channel suggested by the second node.
  A message related to configuring the mobile terminal of the second node.

Method 2 (the second node is the relay node 1): the first node provides a mapping relationship between the user DRB and the backhaul link channel (the backhaul link is served by the DU of the second node), the second node determines the mapping between the backhaul link channel served by the mobile terminal of the second node and the backhaul link channel served by the DU of the second node, and information related to the backhaul link channel served by the DU of the second node, depending on the above information;
  The configuration message 1 in the above step S501 contains at least one of the following information:
    Information related to the DU of the second node, which includes at least one of the following information:
      Identification information of the DU of the second node;
      Information related to the new or existing user DRB served on the backhaul link served by the DU of the second node, for one user DRB, the information includes at least one of the following information:
        User DRB identifier;
        QoS-related information of the user DRB;
        Address information of the target receiving node corresponding to the user DRB, referring to the description of the information in the present disclosure;
        Address information of the source node corresponding to the user DRB, referring to the description of the information in the present disclosure;
        Path identification information related to transmitting the user DRB data packet, referring to the description of the information in the present disclosure.
      Information of the backhaul link channel for serving the user DRB, which can reflect the correspondence between the user DRB and the backhaul link channel served by the DU of the second node, the information at least includes the identification information of the backhaul link channel, information related to the new or existing backhaul link channel served by the DU of the second node, the information including at least one of the following information:
        Identification information of the backhaul link channel;
        Information related to the user DRB served on the backhaul link channel, the information may reflect the correspondence between the backhaul link channel served by the mobile terminal of the second node and the user DRB, and the information includes at least one of the following information:
          User DRB identifier;
          QoS-related information of the user DRB;
          Address information of the target receiving node corresponding to the user DRB, referring to the description of the information in the present disclosure;
          Address information of the source node corresponding to the user DRB, referring to the description of the information in the present disclosure;
          Path identification information related to transmitting the user DRB data packet, referring to the description of the information in the present disclosure;
    Information related to the mobile terminal of the second node, the information contains at least one of the following information:
      identification information of the mobile terminal of the second node;
      Information related to the backhaul link channel served by the mobile terminal of the second node, for one of the backhaul link channels, the information includes at least one of the following information:
        Identification information of the backhaul link channel;
        QoS-related information of the backhaul link channel;
        The maximum acceptable QoS-related information of the backhaul link channel;
        Information related to the user DRB served on the backhaul link channel, the information can reflect the correspondence between the backhaul link channel served by the mobile terminal of the second node and the user DRB, and the information includes, for example, the user DRB identifier, the QoS-related information of the user DRB;

A message of configuring the mobile terminal of the second node.

Indication information related to the feedback information that the second node needs to provide, refers to the description of the indication information in the present disclosure.

The contents of the response message in the above step S502 refers to the method 1 in Embodiment 4. Further, in one embodiment, the second node may determine the contained information according to "the indication information related to the feedback information that the second node needs to provide" transmitted by the first node.

Method 3 (the second node is the relay node 1): the first node provides information (the backhaul link is served by the DU of the second node) related to the backhaul link channel serving user DRB and the information related to the user DRB, and the second node determines a mapping between a backhaul link channel served by the mobile terminal of the second node and a backhaul link channel served by the DU of the second based on the foregoing information:

The configuration message 1 in the above step S501 includes at least one of the following information:
Information related to the DU of the second node, which includes at least one of the following information:
  Identification information of the DU of the second node;
  Information related to a new or existing backhaul link channel served by the DU of the second node, the information includes at least one of the following information:
    Identification information of the backhaul link channel;
    QoS-related information of the backhaul link channel;
  Information related to the new or existing user DRB served on the backhaul link served by the DU of the second node, for one user DRB, the information includes at least one of the following information:
    User DRB identifier;
    QoS-related Information of the user DRB;
    Address information of the target receiving node corresponding to the user DRB, referring to the description of the information in the present disclosure;
    Address information of the source node corresponding to the user DRB, referring to the description of the information in the present disclosure;
    Path identification information related to transmitting the user DRB data packet, referring to the description of the information in the present disclosure.
Information related to the mobile terminal of the second node, the information contains at least one of the following information:
  Identification information of the mobile terminal of the second node;
  Information related to the backhaul link channel served by the mobile terminal of the second node, for one of the backhaul link channels, the information includes at least one of the following information:
    Identification information of the backhaul link channel;
    QoS-related information of the backhaul link channel;
    The maximum acceptable QoS-related information of the backhaul link channel;
    Information related to the user DRB served on the backhaul link channel, the information may reflect the correspondence between the backhaul link channel served by the mobile terminal of the second node and the user DRB, and the information includes at least one of the following information:
      User DRB identifier;
      QoS-related information of the user DRB;

A message of configuring the mobile terminal of the second node.

Indication information related to the feedback information that the second node needs to provide, refer to the description of the indication information in the present disclosure.

The contents of the response message in the above step S502 may refer to the method 1 in Embodiment 4. Further, in one embodiment, the second node may determine the contained information according to "the indication information related to the feedback information that the second node needs to provide" transmitted by the first node.

In the method 4 (the second node is the relay node 1), the first node determines the mapping between the backhaul link channel served by the mobile terminal of the second node and the backhaul link channel served by the DU of the second node, but the mapping of the user DRB and the backhaul link channel served by the DU of the second node and the information related to the backhaul link channel served by the DU of the second node is determined by the second node:

The configuration message 1 in the above step S501 contains at least one of the following information:
Information related to the DU of the second node, which includes at least one of the following information:
  Identification information of the DU of the second node;
  Information related to a new or existing backhaul link channel served by the DU of the second node, the information includes at least one of the following information:
    Identification information of the backhaul link channel;
    Information of the backhaul link channel served by the mobile terminal of the second node and corresponding to the backhaul link channel served by DU of the second node, for example, an identifier of the backhaul link channel, which reflects a mapping relationship between the backhaul link channel served by the mobile terminal of the second node and the backhaul link channel of the DU of the second node;
  Information related to the new or existing user DRB served on the backhaul link served by the DU of the second node, for one user DRB, the information includes at least one of the following information:
    User DRB identifier;
    QoS-related information of the user DRB;
    Address information of the target receiving node corresponding to the user DRB, referring to the description of the information in the present disclosure;

Address information of the source node corresponding to the user DRB, referring to the description of the information in the present disclosure;

Path identification information related to transmitting the user DRB data packet, referring to the description of the information in the present disclosure.

Information related to the mobile terminal of the second node, the information contains at least one of the following information:

identification information of the mobile terminal of the second node, for example, C-RNTI;

Information related to the backhaul link channel served by the mobile terminal of the second node, for one of the backhaul link channels, the information includes at least one of the following information:

Identification information of the backhaul link channel;

QoS-related information of the backhaul link channel;

The maximum acceptable QoS-related information of the backhaul link channel;

Information of the backhaul link channel served by the DU of the second node corresponding to the backhaul link channel, for example, an identifier of the backhaul link channel, which reflects a mapping relationship between the backhaul link channel served by the mobile terminal of the second node and the backhaul link channel served by the DU of the second node;

Information related to the user DRB served on the backhaul link channel, the information can reflect the correspondence between the backhaul link channel served by the mobile terminal of the second node and the user DRB, and the information contains at least one of the following information:

User DRB identifier;

QoS-related information of the user DRB;

A message of configuring the mobile terminal of the second node.

Indication information related to the feedback information that the second node needs to provide, refers to the description of the indication information in the present disclosure.

The content of the response message 2 in the above step S502 refers to the method 1 in Embodiment 4. Further, in one embodiment, the second node may determine the contained information according to "the indication information related to the feedback information that the second node needs to provide" transmitted by the first node.

In method 5 (the second node is relay node 1), the first node provides the second node with the mapping relationship between the user DRB and the backhaul link channel served by the DU of the second node and the information related to the backhaul link channel served by the DU of the second node, and the second node determines a mapping between the backhaul link channel served by the mobile terminal of the second node and the backhaul link channel served by the DU of the second node:

The configuration message 1 in the above step S501 contains at least one of the following information:

Information related to the DU of the second node, which includes at least one of the following information:

Identification information of the DU of the second node;

Information related to a new or existing backhaul link channel served by the DU of the second node, the information includes at least one of the following information:

Identification information of the backhaul link channel;

QoS-related information of the backhaul link channel;

Information related to the UE DRB served by the backhaul link, such as the identification information of the UE DRB;

Information related to the new or existing user DRB served on the backhaul link served by the DU of the second node, for one user DRB, the information includes at least one of the following information:

User DRB identifier;

QoS-related information of the user DRB;

Address information of the target receiving node corresponding to the user DRB, referring to the description of the information in the present disclosure;

Address information of the source node corresponding to the user DRB, referring to the description of the information in the present disclosure;

Path identification information related to transmitting the user DRB data packet, referring to the description of the information in the present disclosure.

Information of the backhaul link channel for serving the user DRB, the information can reflect the correspondence between the user DRB and the backhaul link channel served by the DU of the second node, the information includes at least one of the following information:

Identification information of the backhaul link channel;

QoS-related information of the backhaul link channel;

Information related to the mobile terminal of the second node, the information contains at least one of the following information:

Identification information of the mobile terminal of the second node, for example, C-RNTI;

Information related to the backhaul link channel served by the mobile terminal of the second node, for one backhaul link channel, the information contains at least one of the following information:

Identification information of the backhaul link channel;

QoS-related information of the backhaul link channel;

The maximum acceptable QoS-related information of the backhaul link channel;

Information related to the user DRB served on the backhaul link channel, the information can reflect the correspondence between the backhaul link channel served by the mobile terminal of the second node and the user DRB, and the information contains at least one of the following information:

User DRB identifier;

QoS-related information of the user DRB;

Address information of the target receiving node corresponding to the user DRB, referring to the description of the information in the present disclosure;

Address information of the source node corresponding to the user DRB, referring to the description of the information in the present disclosure;

Path identification information related to transmitting the user DRB data packet, referring to the description of the information in the present disclosure.

A message of configuring the mobile terminal of the second node.

Indication information related to the feedback information that the second node needs to provide, referring to the description of the indication information in the present disclosure.

The content of the response message 2 in the above step S502 refers to the method 1 in Embodiment 4. Further, in one embodiment, the second node may determine the contained information according to "the indication information related to the feedback information that the second node needs to provide" transmitted by the first node.

In the method 6 (the second node is relay node 1), the first node provides the second node with a mapping relationship between the backhaul link channel served by the DU of the second node and the backhaul link channel served by the mobile terminal of the second node, and the mapping relationship between the user DRB and the backhaul link channel served by the DU of the second node, and the second node determines the information related to the backhaul link channel served by the DU of the second node based on the above information:

The configuration message 1 of the above step S501 includes at least one of the following information:
  Information related to the DU of the second node, which includes at least one of the following information:
    Identification information of the DU of the second node;
    Information related to a new or existing backhaul link channel served by the DU of the second node, the information includes at least one of the following information:
      Identification information of the backhaul link channel;
      Information of the backhaul link channel served by the mobile terminal of the second node corresponding to the backhaul link channel, such as the identifier of the backhaul line channel, reflecting the mapping relationship between the backhaul link channel served by the mobile terminal of the second node and the backhaul link channel served by the DU of the second node;
      Information related to user DRB served on the backhaul link channel, the information can reflect the correspondence between the backhaul link channel served by the mobile terminal of the second node and the user DRB, the information at least contains the following information:
        User DRB identifier;
        QoS-related information of the user DRB;
        Address information of the target receiving node corresponding to the user DRB, referring to the description of the information in the present disclosure;
        Address information of the source node corresponding to the user DRB, referring to the description of the information in the present disclosure;
        Path identification information related to transmitting the user DRB data packet, referring to the description of the information in the present disclosure;
    Information related to the new or existing user DRB served on the backhaul link served by the DU of the second node, for one user DRB, the information includes at least one of the following information:
      User DRB identifier;
      QoS-related information of the user DRB;
      Address information of the target receiving node corresponding to the user DRB, referring to the description of the information in the present disclosure;
      Address information of the source node corresponding to the user DRB, referring to the description of the information in the present disclosure;
      Path identification information related to transmitting the user DRB data packet, referring to the description of the information in the present disclosure;
      Information of the backhaul link channel for serving the user DRB, the information can reflect the correspondence between the user DRB and the backhaul link channel served by the DU of the second node, the information at least contains the following information:
  Information related to the mobile terminal of the second node, the information contains at least one of the following information:
    Identification information of the mobile terminal of the second node, for example, C-RNTI;
    Information related to the backhaul link channel served by the mobile terminal of the second node, for one backhaul link channel, the information contains at least one of the following information:
      Identification information of the backhaul link channel;
      QoS-related information of the backhaul link channel;
      The maximum acceptable QoS-related information of the backhaul link channel;
      Information related to the user DRB served on the backhaul link channel, the information can reflect the correspondence between the backhaul link channel served by the mobile terminal of the second node and the user DRB, and the information at least contains one of the following information:
        User DRB identifier;
        QoS-related information of the user DRB;
        Address information of the target receiving node corresponding to the user DRB, referring to the description of the information in the present disclosure;
        Address information of the source node corresponding to the user DRB, referring to the description of the information in the present disclosure;
        Path identification information related to transmitting the user DRB data packet, referring to the description of the information in the present disclosure;
  A message of configuring the mobile terminal of the second node.

Indication information related to the feedback information that the second node needs to provide, referring to the description of the indication information in the present disclosure.

The content of the response message 2 in the above step S502 refer to the method 1 in Embodiment 4. Further, in one embodiment, the second node may determine the contained information according to "the indication information related to the feedback information that the second node needs to provide" transmitted by the first node.

In the method 7 (the second node is relay node 1), the first node determines the mapping between the backhaul link channel served by the mobile terminal of the second node and the backhaul link channel served by the DU of the second node, and the information related to the backhaul link channel served by the DU of the second node, and the second node determines the mapping relationship between the UE DRB and the backhaul link channel served by the DU of the second node based on the above information:

The configuration message 1 of the above step S501 includes at least one of the following information:
  Information related to the DU of the second node, which includes at least one of the following information:
    Identification information of the DU of the second node;
    Information related to a new or existing backhaul link channel served by the DU of the second node, the information includes at least one of the following information:
      Identification information of the backhaul link channel;
      QoS-related information of the backhaul link channel;
      Information of the backhaul link channel served by the mobile terminal of the second node corresponding to the backhaul link channel, for example, an identifier of the backhaul link channel, which reflects a mapping relationship between the backhaul link channel served by the mobile terminal of the second node and the backhaul link channel served the DU of the second node;
    Information related to the new or existing user DRB served on the backhaul link served by the DU of the second node, for one user DRB, the information includes at least one of the following information:
      User DRB identifier;
      QoS-related information of the user DRB;
      Address information of the target receiving node corresponding to the user DRB, referring to the description of the information in the present disclosure;
      Address information of the source node corresponding to the user DRB, referring to the description of the information in the present disclosure;
      Path identification information related to transmitting the user DRB data packet, referring to the description of the information in the present disclosure;
  Information related to the mobile terminal of the second node, the information contains at least one of the following information:
    Identification information of the mobile terminal of the second node, for example, C-RNTI;
    Information related to the backhaul link channel served by the mobile terminal of the second node, for one of the backhaul link channels, the information includes at least one of the following information:
      Identification information of the backhaul link channel;
      QoS-related information of the backhaul link channel;
      The maximum acceptable QoS-related information of the backhaul link channel;
      Information related to the user DRB served on the backhaul link channel, the information can reflect the correspondence between the backhaul link channel served by the mobile terminal of the second node and the user DRB, and the information contains at least one of the following information:
        User DRB identifier;
        QoS-related information of the user DRB;
    A message of configuring the mobile terminal of the second node.
  Indication information related to the feedback information that the second node needs to provide, referring to the description of the indication information in the present disclosure.

The content of the response message 2 in the above step S502 may refer to the method 1 in Embodiment 4. Further, in one embodiment, the second node may determine the contained information according to "the indication information related to the feedback information that the second node needs to provide" transmitted by the first node.

In the method 8 (the second node is relay node 1), the first node determines the mapping between the backhaul link channel served by the mobile terminal of the second node and the backhaul link channel served by the DU of the second node, the mapping between the user DRB and the backhaul link channel served by the DU of the second node, and the information related to the backhaul link channel served by the DU of the second node:

The configuration message 1 of the above step S501 contains at least one of the following information:
  Information related to the DU of the second node, which includes at least one of the following information:
    Identification information of the DU of the second node;
    Information related to a new or existing backhaul link channel served by the DU of the second node, the information at least includes one of the following information:
      Identification information of the backhaul link channel;
      QoS-related information of the backhaul link channel.
      Information of the backhaul link channel served by the mobile terminal of the second node corresponding to the backhaul link channel, for example, an identifier of the backhaul link channel, which reflects a mapping relationship between the backhaul link channel served by the mobile terminal of the second node and the backhaul link channel served by the DU of the second node;
      Information related to the user DRB served on the backhaul link channel, the information can reflect the correspondence between the backhaul link channel served by the mobile terminal of the second node and the user DRB, and the information contains at least one of the following information:
        User DRB identifier;
        QoS-related information of the user DRB;

Address information of the target receiving node corresponding to the user DRB, referring to the description of the information in the present disclosure;
Address information of the source node corresponding to the user DRB, referring to the description of the information in the present disclosure;
Path identification information related to transmitting the user DRB data packet, referring to the description of the information in the present disclosure;

Information related to the new or existing user DRB served on the backhaul link served by the DU of the second node, for one user DRB, the information at least includes one of the following information:
User DRB identifier;
QoS-related information of the user DRB;
Address information of the target receiving node corresponding to the user DRB, referring to the description of the information in the present disclosure;
Address information of the source node corresponding to the user DRB, referring to the description of the information in the present disclosure;
Path identification information related to transmitting the user DRB data packet, referring to the description of the information in the present disclosure.
Information of the backhaul link channel for serving the user DRB, the information can reflect the correspondence between the user DRB and the backhaul link—channel served by the DU of the second node, the information at least includes the following information:
Identification information of the backhaul link channel;
QoS-related information of the backhaul link channel.

Information related to the mobile terminal of the second node, the information at least contains one of the following information:
Identification information of the mobile terminal of the second node, for example, C-RNTI;
Information related to the backhaul link channel served by the mobile terminal of the second node, for one of the backhaul link channels, the information at least includes one of the following information:
Identification information of the backhaul link channel;
QoS-related information of the backhaul link channel;
The maximum acceptable QoS-related information of the backhaul link channel;
Information related to the user DRB served on the backhaul link channel, the information can reflect the correspondence between the backhaul link channel served by the mobile terminal of the second node and the user DRB, and the information at least contains one of the following information:
User DRB identifier;
QoS-related information of the user DRB;
Address information of the target receiving node corresponding to the user DRB, refers to the description of the information in the present disclosure;
Address information of the source node corresponding to the user DRB, refers to the description of the information in the present disclosure;
Path identification information related to transmitting the user DRB data packet, refers to the description of the information in the present disclosure.

A message of configuring the mobile terminal of the second node.
Indication information related to the feedback information that the second node needs to provide, referring to the description of the indication information in the present disclosure.

The content contained in the response message 2 in the above step S502 may refer to the method 1 in Embodiment 4. Further, in one embodiment, the second node may determine the contained information according to the "indication information related to the feedback information that the second node needs to provide" transmitted by the first node.

Embodiment 5 (when the Second Node is the Relay Node 2 in FIG. 1, the Configuration Flow Between the First Node and the Second Node)

When the second node is the relay node 2 in FIG. 1, the flow between the first node and the second node shown in FIG. 5 may help the second node to determine the mapping between the backhaul link channel served by the DU of the second node and the user DRB, and the method implemented by the flow includes:

The configuration message 1 in the above step S501 at least contains one of the following information:
Information related to the DU of the second node, which at least includes one of the following information:
Identification information of the DU of the second node;
Information related to the new or existing user DRB served by the DU of the second node, for one user DRB, the information at least includes one of the following information:
User DRB identifier;
QoS-related information of the user DRB;
Address information of the target receiving node corresponding to the user DRB, referring to the description of the information in the present disclosure;
Address information of the source node corresponding to the user DRB, referring to the description of the information in the present disclosure;
Path identification information related to transmitting the user DRB data packet, referring to the description of the information in the present disclosure.
Information related to the mobile terminal of the second node, the information at least contains one of the following information:
Identification information of the mobile terminal of the second node, for example, C-RNTI;
Information related to the backhaul link channel served by the mobile terminal of the second node, for one of the backhaul link channels, the information at least includes one of the following information:
Identification information of the backhaul link channel;
QoS-related information of the backhaul link channel;

The maximum acceptable QoS-related information of the backhaul link channel;

Information related to the user DRB served on the backhaul link channel, the information can reflect the correspondence between the backhaul link channel served by the mobile terminal of the second node and the user DRB, and the information at least contains one of the following information:

User DRB identifier;

QoS-related information of the user DRB;

Address information of the target receiving node corresponding to the user DRB, referring to the description of the information in the present disclosure;

Address information of the source node corresponding to the user DRB, referring to the description of the information in the present disclosure;

Path identification information related to transmitting the user DRB data packet, referring to the description of the information in the present disclosure;

A message of configuring the mobile terminal of the second node.

The response message 2 in the above step S502 contains at least one of the following information:

Information related to the user DRB accepted by the second node, for example, an identifier of the user DRB;

Information related to the DU of the second node, which includes at least one of the following information:

Information related to the user DRB served by the DU of the second node that is able or unable to be accepted by the DU of the second node, the information includes at least one of the following information:

Information related to the new or existing user DRB accepted by the DU of the second node, for example, the identification information of the user DRB;

Information related to the new or existing user DRB that cannot be accepted by the DU of the second node, for example, an identifier of the user DRB;

Configuration information of other nodes (such as users, mobile terminals of other relay nodes) served by the DU of the second node, for example, Cell group configuration, see 3GPP TS38.331; in one embodiment, configuration information (such as an RLC layer configuration, a MAC layer configuration, a PHY layer configuration, etc.) of a backhaul link channel served by a DU of the second node may also be included.

Information related to the mobile terminal of the second node, the information includes at least one of the following information:

Information related to a backhaul link channel served by the mobile terminal of the second node that is able or unable to be accepted by the mobile terminal of the second node, the information includes at least one of the following information:

Information related to a backhaul link channel served by the mobile terminal of the second node that can be accepted by the mobile terminal of the second node, the information includes at least one of the following information:

Identification information of the backhaul link channel;

QoS-related information of the backhaul link channel generated by the second node;

Information related to the user DRB served by the backhaul link channel, for example, an identifier of the user DRB;

Information related to a backhaul link channel served by the mobile terminal of the second node that cannot be accepted by the mobile terminal of the second node, the information includes at least one of the following information:

Identification information of the backhaul link channel;

QoS-related information of the backhaul link channel suggested by the second node;

A message related to configuring the mobile terminal of the second node.

Embodiment 6 (the Process of Configuring the DU in the Anchor Node, the Relay Node 1 and the Relay Node 2 for the User Accessing the Relay Node 2 in FIG. 1)

Figure 8:
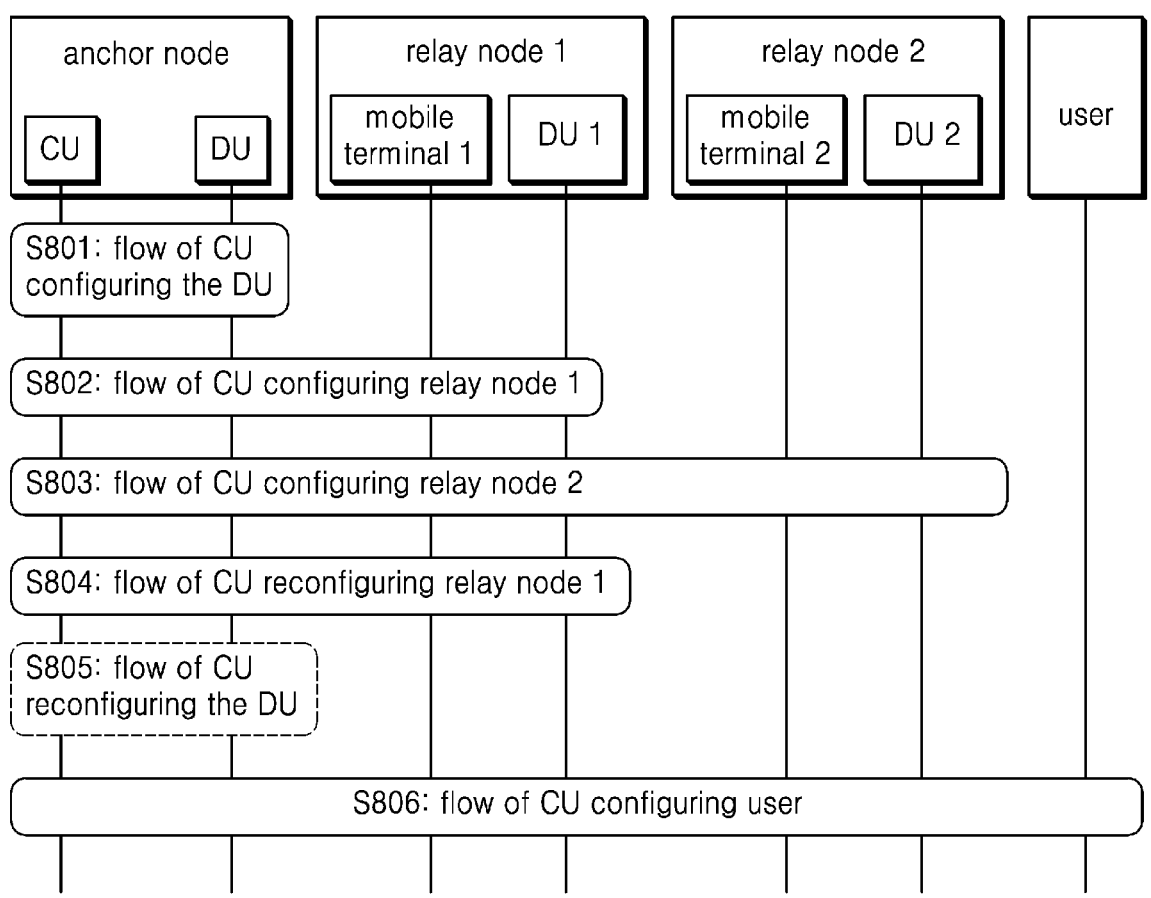
FIG. 8 is a flowchart for configuring a user in a multi-hop network according to an embodiment of the present disclosure.

In FIG. 1, the data packets of the user accessing the relay node 2 need to pass through the DU in the anchor node, the relay node 1 and the relay node 2, and the three nodes need to be configured in this process to determine the mapping between the user DRB and the backhaul link, and the mapping between the backhaul links carrying these user DRBs. FIG. 8 shows the flow of the configuration:

Step S801: The process of configuring the DU by the CU, referring to the flow in Embodiment 3;

Step S802: The process of configuring the relay node 1 by the CU, referring to the flow in Embodiment 4;

Step S803: The process of configuring the relay node 2 by the CU, referring to the flow in Embodiment 5;

Step S804: The process of reconfiguring the relay node 1 by the CU. The flow is that: the configuration of the relay node 1 needs to be changed after the foregoing steps, and the relay node 1 needs to be reconfigured in this flow, see the flow of Embodiment 4.

Step S805: The flow of reconfiguring the DU by the CU, the flow is that the configuration of the DU needs to be changed after the foregoing step, and the DU needs to be reconfigured in this flow, see the flow of Embodiment 3;

Step S806: After the foregoing steps, the configuration information of the user has been determined, and the CU configures the user. For example, the CU transmits an RRCReconfiguration message to the user, and the user answers an RRCReconfigurationComplete message to the CU, see 3GPP TS38.331.

In the foregoing steps, the order of S801~S803 may be changed, the order of steps S804~S805 may be changed, and steps S804 and S805 are optional steps.

Figure 9:
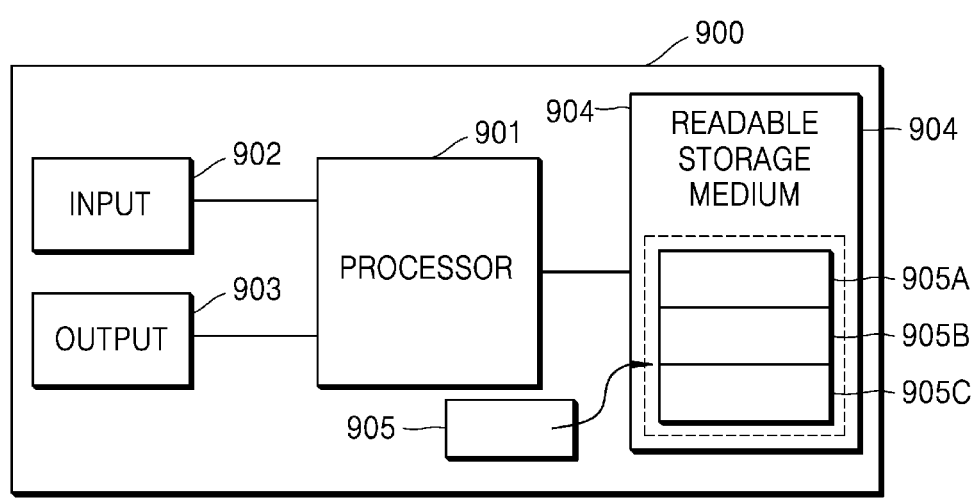
FIG. 9 is a block diagram of an example hardware arrangement of an example device according to an embodiment of the present disclosure.

FIG. 9 is a block diagram of an example hardware arrangement of an example device according to an embodiment of the disclosure. The hardware arrangement 900 may be any of the first node (device) and the second node (device). The hardware arrangement 900 may include a processor 901. The processor 901 may be a single processing unit or multiple processing units for performing different acts of the flows described herein. The arrangement 900 may also include an input unit 902 for receiving signals from other entities, and an output unit 903 for providing signals to other entities. The input unit 902 and the output unit 903 may be arranged as a single entity or as separate entities.

Moreover, the arrangement 900 may include at least one readable storage medium 904 in the form of a non-volatile or volatile memory, such as an electrically erasable programmable read only memory (EEPROM), flash memory, optical disk, Blu-ray disk, and/or Hard disk drive. The readable storage medium 904 may include a computer program 905, which may include codes/computer readable instructions that, when executed by the processor 901 in the arrangement 900, cause the hardware arrangement 900 and/or the device including the hardware arrangement 900 may perform, for example, the flow described above in connection with any of FIGS. 5-8 and any variations thereof.

The computer program 905 may be configured as computer program codes having a computer program module 905A-905C architecture, for example. Thus, in an example embodiment in which the hardware arrangement 900 is used as a CU of a base station or base station, or a relay node, the codes in the computer program of the arrangement 900 may be used to perform the method shown in any of FIGS. 5-8. However, other modules for performing the various steps of the various methods described herein may also be included in the computer program 905.

The computer program module may substantially perform the various actions in the flow shown in any of FIGS. 5-8 to simulate various devices. In other words, when different computer program modules are executed in the processor 901, they may correspond to various different units of the various devices mentioned herein.

The processor may be a single CPU (Central Processing Unit), but may also include two or more processing units. For example, a processor may include a general purpose microprocessor, an instruction set processor and/or a related chipset and/or a special purpose microprocessor (e.g., an application specific integrated circuit (ASIC)). The processor may also include an onboard memory for caching purposes. The computer program may be carried by a computer program product connected to the processor. The computer program product may comprise a computer readable medium having stored thereon a computer program. For example, the computer program product may be flash memory, random access memory (RAM), read only memory (ROM), EEPROM, and the computer program modules described above may be distributed to different computers program products in the form of memory within the UE in alternative embodiments.

Figure 10:
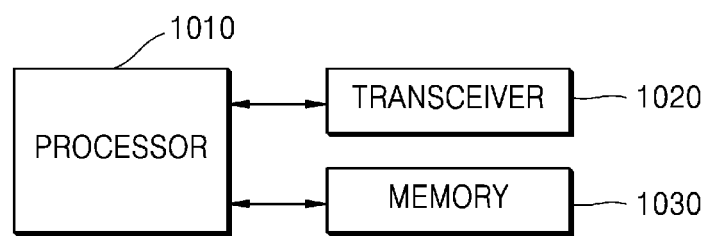
FIG. 10 is a block diagram illustrating the structure of a first node according to an embodiment of the present disclosure.

FIG. 10 is a block diagram illustrating the structure of a second node according to another embodiment of the present disclosure.

Referring to the FIG. 10, the second node may include a processor 1010, a transceiver 1020 and a memory 1030. However, all of the illustrated components are not essential. The second node may be implemented by more or less components than those illustrated in FIG. 10. In addition, the processor 1010 and the transceiver 1020 and the memory 1030 may be implemented as a single chip according to another embodiment. The processor 1010 may correspond to a processor 901 of FIG. 9. The memory 1030 may correspond to a readable storage medium 904 of FIG. 9.

The aforementioned components will now be described in detail.

The processor 1010 may include one or more processors or other processing devices that control the proposed function, process, and/or method. Operation of the second node may be implemented by the processor 1010.

The processor 1010 may determine a channel used by the second node to transmit data received by the second node, and determine a radio bearer used by the second node to transmit data received by the second node.

The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The transceiver 1020 may receive a first message transmitted by a first node, wherein the first message comprises information for determining a channel used by the second node to transmit data received by the second node, and/or information for determining a radio bearer used by the second node to transmit data received by the second node, and may transmit the received data mapped to the channel and/or the radio bearer used to transmit the data.

The memory 1030 may store the control information or the data included in a signal obtained by the second node. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

Although it is not illustrated in FIG. 10, the second node may further include a distributed unit (DU) and/or a mobile terminal. The Distributed unit may serve QoS-related information of a backhaul link channel and/or QoS-related information of a user radio bearer. The mobile terminal may serve QoS-related information of the backhaul link channel.

Figure 11:
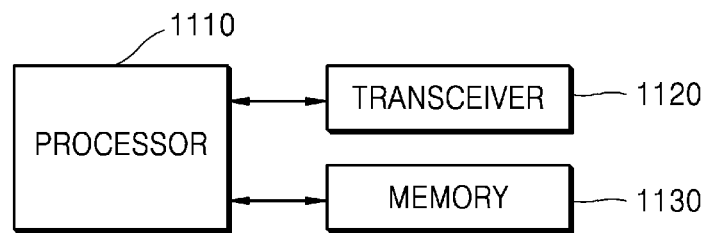
FIG. 11 is a block diagram illustrating the structure of a second node according to an embodiment of the present disclosure.

FIG. 11 is a block diagram illustrating the structure of a first node according to another embodiment of the present disclosure.

Referring to the FIG. 11, the first node may include a processor 1110, a transceiver 1120 and a memory 1130. However, all of the illustrated components are not essential. The first node may be implemented by more or less components than those illustrated in FIG. 11. In addition, the processor 1110 and the transceiver 1120 and the memory 1130 may be implemented as a single chip according to another embodiment. The processor 1110 may correspond to a processor 901 of FIG. 9. The memory 1130 may correspond to a readable storage medium 904 of FIG. 9.

The aforementioned components will now be described in detail.

The processor 1110 may include one or more processors or other processing devices that control the proposed function, process, and/or method. Operation of the second node may be implemented by the processor 1110.

The transceiver 1120 may include a RF transmitter for up-converting and amplifying a transmitted signal, and a RF receiver for down-converting a frequency of a received signal. However, according to another embodiment, the transceiver 1120 may be implemented by more or less components than those illustrated in components.

The transceiver 1120 may be connected to the processor 1110 and transmit and/or receive a signal. The signal may include control information and data. In addition, the transceiver 1120 may receive the signal through a wireless channel and output the signal to the processor 1110. The transceiver 1120 may transmit a signal output from the processor 1110 through the wireless channel.

The transceiver 1120 may transmit a first message to a second message, the first message comprises information for determining a channel used by the second node to transmit data received by the second node, and/or information for determining a radio bearer used by the second node to transmit data received by the second node, and receive a response message of the first message transmitted by the second node.

The memory 1130 may store the control information or the data included in a signal obtained by the second node. The memory 1130 may be connected to the processor 1110 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

The present disclosure has been described in connection with the preferred embodiments. It should be appreciated that various other changes, substitutions and additions may be made by those skilled in the art without departing from the spirit and scope of the disclosure. Therefore, the scope of the present disclosure is not limited to the specific embodiments described above, but is defined by the appended claims.

In addition, the functions described herein as being implemented by only hardware, only software, and/or firmware may also be implemented by dedicated hardware, a combination of general-purpose hardware and software, and the like. For example, functions described as being implemented by dedicated hardware (e.g., Field Programmable Gate Array (FPGA), Application Specific Integrated Circuit (ASIC), etc.) may be implemented by general-purpose hardware (e.g., central processing unit (CPU), digital signal processing (DSP) is implemented in a way that is combined with software and vice versa.

The invention claimed is:

1. A method, performed by a first node, in a wireless communication system, the method comprising:
    transmitting, to a second node, a user equipment (UE) context configuration request message comprising information on at least one backhaul Radio Link Control (RLC) channel to be setup including identification information of a first backhaul RLC channel associated with a distributed unit (DU) of the second node and backhaul RLC channel mapping information for the first backhaul RLC channel; and
    receiving, from the second node, a UE context configuration response message in response to the UE context configuration request message,
    wherein the backhaul RLC channel mapping information indicates a mapping relation between the first backhaul RLC channel and a second backhaul RLC channel served by a mobile terminal (MT) of the second node,
    wherein, in case that the backhaul RLC channel mapping information configures a first mapping in a downlink direction, the backhaul RLC channel mapping information comprises an ingress backhaul RLC channel identifier associated with the second backhaul RLC channel, and
    wherein, in case that the backhaul RLC channel mapping information configures a second mapping in an uplink direction, the backhaul RLC channel mapping information comprises an egress backhaul RLC channel identifier associated with the second backhaul RLC channel.

2. The method of claim 1, wherein the UE context configuration request message further comprises Quality of Service (QOS) related information of the first backhaul RLC channel.

3. The method of claim 1,
    wherein the UE context configuration request message is a UE context setup request message and the UE context configuration response message is a UE context setup response message, or
    wherein the UE context configuration request message is a UE context modification request message and the UE context configuration response message is a UE context modification response message.

4. The method of claim 1,
    wherein the first node comprises a centralized unit of a donor node; and
    wherein the second node comprises at least one of a DU of the donor node, or a DU of an Integrated Access and Backhaul (IAB) node.

5. A method, performed by a second node, in a wireless communication system, the method comprising:
    receiving, from a first node, a user equipment (UE) context configuration request message comprising information on at least one backhaul Radio Link Control (RLC) channel to be setup including identification information of a first backhaul RLC channel associated with a distributed unit (DU) of the second node and backhaul RLC channel mapping information for the first backhaul RLC channel; and
    transmitting, to the first node, a UE context configuration response message in response to the UE context configuration request message,
    wherein the backhaul RLC channel mapping information indicates a mapping relation between the first backhaul RLC channel and a second backhaul RLC channel served by a mobile terminal (MT) of the second node,
    wherein, in case that the backhaul RLC channel mapping information configures a first mapping in a downlink direction, the backhaul RLC channel mapping information comprises an ingress backhaul RLC channel identifier associated with the second backhaul RLC channel, and
    wherein, in case that the backhaul RLC channel mapping information configures a second mapping in an uplink direction, the backhaul RLC channel mapping information comprises an egress backhaul RLC channel identifier associated with the second backhaul RLC channel.

6. The method of claim 5, wherein the UE context configuration request message further comprises Quality of Service (QOS) related information of the first backhaul RLC channel.

7. The method of claim 5,
    wherein the UE context configuration request message is a UE context setup request message and the UE context configuration response message is a UE context setup response message, or
    wherein the UE context configuration request message is a UE context modification request message and the UE context configuration response message is a UE context modification response message.

8. The method of claim 5,
    wherein the first node comprises a centralized unit of a donor node; and
    wherein the second node comprises at least one of a DU of the donor node, or a DU of an Integrated Access and Backhaul (IAB) node.

9. A first node in a wireless communication system, the first node comprising:
a transceiver; and
at least one processor configured to:
transmit, to a second node via the transceiver, a user equipment (UE) context configuration request message comprising information on at least one backhaul Radio Link Control (RLC) channel to be setup including identification information of a first backhaul RLC channel associated with a distributed unit (DU) of the second node and backhaul RLC channel mapping information for the first backhaul RLC channel, and
receive, from the second node via the transceiver, a UE context configuration response message in response to the UE context configuration request message,
wherein the backhaul RLC channel mapping information indicates a mapping relation between the first backhaul RLC channel and a second backhaul RLC channel served by a mobile terminal (MT) of the second node,
wherein, in case that the backhaul RLC channel mapping information configures a first mapping in a downlink direction, the backhaul RLC channel mapping information comprises an ingress backhaul RLC channel identifier associated with the second backhaul RLC channel, and
wherein, in case that the backhaul RLC channel mapping information configures a second mapping in an uplink direction, the backhaul RLC channel mapping information comprises an egress backhaul RLC channel identifier associated with the second backhaul RLC channel.

10. The first node of claim 9, wherein the UE context configuration request message further comprises Quality of Service (QOS) related information of the first backhaul RLC channel.

11. The first node of claim 9,
wherein the UE context configuration request message is a UE context setup request message and the UE context configuration response message is a UE context setup response message, or
wherein the UE context configuration request message is a UE context modification request message and the UE context configuration response message is a UE context modification response message.

12. The first node of claim 9,
wherein the first node comprises a centralized unit of a donor node; and
wherein the second node comprises at least one of a DU of the donor node, or a DU of an Integrated Access and Backhaul (IAB) node.

13. A second node in a wireless communication system, the second node comprising:
a transceiver; and
at least one processor configured to:
receive, from a first node via the transceiver, a user equipment (UE) context configuration request message comprising information on at least one backhaul Radio Link Control (RLC) channel to be setup including identification information of a first backhaul RLC channel associated with a distributed unit (DU) of the second node and backhaul RLC channel mapping information for the first backhaul RLC channel, and
transmit, to the first node via the transceiver, a UE context configuration response message in response to the UE context configuration request message,
wherein the backhaul RLC channel mapping information indicates a mapping relation between the first backhaul RLC channel and a second backhaul RLC channel served by a mobile terminal (MT) of the second node,
wherein, in case that the backhaul RLC channel mapping information configures a first mapping in a downlink direction, the backhaul RLC channel mapping information comprises an ingress backhaul RLC channel identifier associated with the second backhaul RLC channel, and
wherein, in case that the backhaul RLC channel mapping information configures a second mapping in an uplink direction, the backhaul RLC channel mapping information comprises an egress backhaul RLC channel identifier associated with the second backhaul RLC channel.

14. The second node of claim 13, wherein the UE context configuration request message further comprises Quality of Service (QOS) related information of the first backhaul RLC channel.

15. The second node of claim 13,
wherein the UE context configuration request message is a UE context setup request message and the UE context configuration response message is a UE context setup response message, or
wherein the UE context configuration request message is a UE context modification request message and the UE context configuration response message is a UE context modification response message.

16. The second node of claim 13,
wherein the first node comprises a centralized unit of a donor node; and
wherein the second node comprises at least one of a DU of the donor node, or a DU of an Integrated Access and Backhaul (IAB) node.

* * * * *